(12) United States Patent
Cha et al.

(10) Patent No.: US 12,438,593 B2
(45) Date of Patent: Oct. 7, 2025

(54) ELECTRONIC DEVICE CHANGING TRANSMISSION ANTENNA AND METHOD FOR OPERATING THE SAME

(71) Applicant: Samsung Electronics Co., Ltd., Suwon-si (KR)

(72) Inventors: Jaemoon Cha, Suwon-si (KR); Minhwan Jeon, Suwon-si (KR); Jaewoo Park, Suwon-si (KR); Yeonjoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/446,814

(22) Filed: Aug. 9, 2023

(65) Prior Publication Data
US 2024/0056162 A1    Feb. 15, 2024

Related U.S. Application Data

(63) Continuation of application No. PCT/KR2023/011790, filed on Aug. 9, 2023.

(30) Foreign Application Priority Data

Aug. 9, 2022   (KR) .................. 10-2022-0099524
Oct. 5, 2022   (KR) .................. 10-2022-0127055

(51) Int. Cl.
*H04B 7/08*    (2006.01)
*H04B 7/06*    (2006.01)

(52) U.S. Cl.
CPC ......... *H04B 7/0814* (2013.01); *H04B 7/0608* (2013.01)

(58) Field of Classification Search
CPC ...... H04B 7/08; H04B 7/0802; H04B 7/0805; H04B 7/0814; H04B 7/04; H04B 7/06; H04B 7/0602; H04B 7/0608
See application file for complete search history.

(56) References Cited

U.S. PATENT DOCUMENTS 7,031,744 B2 *   4/2006   Kuriyama ............ H04B 7/0608
                                                  455/575.1
7,995,100 B2 *   8/2011   Cho ................... H04M 1/72463
                                                  348/374
(Continued)

FOREIGN PATENT DOCUMENTS

CN      113783582      12/2021
EP      3671948        6/2020
(Continued)

OTHER PUBLICATIONS

Search Report and Written Opinion dated Nov. 13, 2023 issued in International Patent Application No. PCT/KR2023/011790.
(Continued)

*Primary Examiner* — James M Perez
(74) *Attorney, Agent, or Firm* — NIXON & VANDERHYE P.C.

(57) ABSTRACT

According to an embodiment, an electronic device may comprise: at least one communication processor, an RF circuitry connected to the at least one communication processor, and a plurality of antennas connected to the RF circuitry. The at least one communication processor may be configured to, based on identifying a folding state of the electronic device being an open state, control the RF circuitry to provide a first RF signal corresponding to a first frequency band to a first antenna among the plurality of antennas. The at least one communication processor may be configured to, based on identifying the folding state of the electronic device being a closed state, identify whether the electronic device is gripped. The at least one communication processor may be configured to control the RF circuitry to provide a second RF signal corresponding to the first frequency band to a second antenna different from the first (Continued)

antenna among the plurality of antennas, based on identifying that the electronic device is gripped.

19 Claims, 18 Drawing Sheets

(56) References Cited

U.S. PATENT DOCUMENTS

| | | | | |
|---|---|---|---|---|
| 8,725,213 B2* | 5/2014 | Nakamura | ............ | H01Q 1/243 |
| | | | | 455/562.1 |
| 9,294,181 B2* | 3/2016 | Park | ............ | H04B 7/0814 |
| 9,369,187 B1* | 6/2016 | Sammeta | ............ | H04B 7/0802 |
| 9,379,778 B2* | 6/2016 | Roh | ............ | G06K 19/0726 |
| 9,673,884 B2* | 6/2017 | Kang | ............ | H04B 7/0814 |
| 9,867,139 B1* | 1/2018 | Khasgiwala | ......... | H04B 17/318 |
| 10,050,332 B2* | 8/2018 | Kim | ............ | H01Q 1/50 |
| 10,906,010 B2* | 2/2021 | Fanchini | ............ | B01D 71/301 |
| 11,075,469 B2* | 7/2021 | Huh | ............ | H04B 7/0617 |
| 11,115,511 B1* | 9/2021 | Ghaemi | ............ | H04B 7/0602 |
| 11,153,001 B2* | 10/2021 | Yu | ............ | H04M 1/72454 |
| 11,158,929 B2* | 10/2021 | Shi | ............ | G06F 1/1647 |
| 11,165,937 B2* | 11/2021 | Wang | ............ | H04B 7/0834 |
| 11,342,973 B1* | 5/2022 | Aldalbahi | ............ | H04B 7/0473 |
| 11,342,975 B2* | 5/2022 | Ju | ............ | H04B 1/40 |
| 11,374,635 B2* | 6/2022 | Huang | ............ | H04B 7/0874 |
| 11,450,963 B2* | 9/2022 | Do | ............ | H01Q 1/24 |
| 11,622,288 B2* | 4/2023 | Raghavan | ............ | H04B 7/063 |
| | | | | 375/267 |
| 11,652,521 B1* | 5/2023 | Chisu | ............ | H04W 28/0268 |
| | | | | 375/267 |
| 11,664,863 B2* | 5/2023 | Ramasamy | ............ | H04B 7/0691 |
| | | | | 375/267 |
| 11,953,001 B2* | 4/2024 | Park | ............ | F04C 29/02 |
| 11,978,947 B2* | 5/2024 | Lu | ............ | H01Q 21/28 |
| 11,984,646 B2* | 5/2024 | Wu | ............ | H01Q 1/42 |
| 2002/0068602 A1* | 6/2002 | Kuriyama | ............ | H04B 7/0805 |
| | | | | 343/702 |
| 2003/0162519 A1* | 8/2003 | Smith | ............ | H04B 7/0874 |
| | | | | 455/562.1 |
| 2004/0053582 A1* | 3/2004 | Nakanishi | ............ | H01Q 3/24 |
| | | | | 455/101 |
| 2004/0214607 A1* | 10/2004 | Namiki | ............ | H04B 7/0808 |
| | | | | 455/562.1 |
| 2004/0242277 A1* | 12/2004 | Kiribayashi | ......... | H04B 7/0808 |
| | | | | 455/562.1 |
| 2006/0003797 A1* | 1/2006 | Ogawa | ............ | H04B 7/0602 |
| | | | | 455/90.3 |
| 2006/0056357 A1* | 3/2006 | Payne | ............ | H04B 7/0811 |
| | | | | 370/334 |
| 2006/0114496 A1* | 6/2006 | Cho | ............ | H04M 1/72463 |
| | | | | 358/1.15 |
| 2012/0196651 A1* | 8/2012 | Nakamura | ............ | H04B 7/0834 |
| | | | | 455/566 |
| 2012/0315851 A1* | 12/2012 | Park | ............ | H04B 7/0814 |
| | | | | 455/575.7 |
| 2014/0045425 A1* | 2/2014 | Roh | ............ | G06K 19/0726 |
| | | | | 455/41.1 |
| 2018/0007600 A1* | 1/2018 | Gopal | ............ | H04B 7/0404 |
| 2018/0054832 A1* | 2/2018 | Luo | ............ | H04L 5/0094 |
| 2018/0290108 A1* | 10/2018 | Fanchini | ............ | C02F 1/281 |
| 2019/0393944 A1* | 12/2019 | Huang | ............ | H04W 72/044 |
| 2020/0344336 A1* | 10/2020 | Li | ............ | H04M 1/0268 |
| 2020/0411957 A1* | 12/2020 | Zhu | ............ | H01Q 5/307 |
| 2021/0021017 A1* | 1/2021 | Li | ............ | G06F 1/1671 |
| 2021/0208721 A1* | 7/2021 | Lee | ............ | A45C 11/00 |
| 2021/0297570 A1* | 9/2021 | Wang | ............ | H04N 23/52 |
| 2021/0376453 A1* | 12/2021 | Han | ............ | H01Q 1/42 |
| 2022/0109472 A1 | 4/2022 | Na et al. | | |
| 2022/0345557 A1* | 10/2022 | Lee | ............ | H04M 1/0241 |
| 2023/0021042 A1* | 1/2023 | Park | ............ | F04C 18/356 |
| 2023/0103745 A1* | 4/2023 | Lu | ............ | G06F 1/162 |
| | | | | 343/700 R |
| 2023/0118127 A1* | 4/2023 | Ramasamy | ............ | H04B 7/0691 |
| | | | | 375/267 |
| 2023/0208483 A1* | 6/2023 | Cha | ............ | H04W 52/367 |
| | | | | 455/522 |
| 2023/0299466 A1* | 9/2023 | An | ............ | H01Q 5/328 |
| | | | | 361/807 |
| 2023/0397132 A1* | 12/2023 | Cha | ............ | H04W 52/367 |
| 2024/0031854 A1* | 1/2024 | Oh | ............ | H04W 36/0088 |
| 2024/0056162 A1* | 2/2024 | Cha | ............ | H04B 7/0814 |
| 2024/0105745 A1* | 3/2024 | Kim | ............ | H01L 27/14685 |
| 2024/0291170 A1* | 8/2024 | Miau | ............ | H01Q 21/30 |
| 2024/0381269 A1* | 11/2024 | Cha | ............ | H04W 52/14 |

FOREIGN PATENT DOCUMENTS

| | | |
|---|---|---|
| KR | 20070053932 A | 5/2007 |
| KR | 10-2016-0035421 | 3/2016 |
| KR | 10-2020-0074411 | 6/2020 |
| KR | 20210010293 A | 1/2021 |
| KR | 20210111050 A | 9/2021 |
| KR | 10-2021-0147712 | 12/2021 |
| KR | 10-2022-0051726 | 4/2022 |
| KR | 10-2022-0077434 | 6/2022 |
| WO | 2019/062891 | 4/2019 |
| WO | 2020/228703 | 11/2020 |
| WO | 2021/118201 | 6/2021 |
| WO | 2022/019508 | 1/2022 |
| WO | 2022045855 A1 | 3/2022 |

OTHER PUBLICATIONS

European Search Report for EP Application No. 23853002.6 dated Jun. 20, 2025, 14 pages.

* cited by examiner

ELECTRONIC DEVICE CHANGING TRANSMISSION ANTENNA AND METHOD FOR OPERATING THE SAME

CROSS-REFERENCE TO RELATED APPLICATIONS

This application is a continuation of International Application No. PCT/KR2023/011790 designating the United States, filed on Aug. 9, 2023, in the Korean Intellectual Property Receiving Office and claiming priority to Korean Patent Application Nos. 10-2022-0099524, filed on Aug. 9, 2022, and 10-2022-0127055, filed on Oct. 5, 2022, in the Korean Intellectual Property Office, the disclosures of all of which are incorporated by reference herein in their entireties.

BACKGROUND

Field

The disclosure relates to an electronic device changing a transmission antenna and a method for operating the same.

Description of Related Art

To transmit a signal from an electronic device to a communication network (e.g., a base station), data generated from a processor or a communication processor in the electronic device may be signal-processed through a radio frequency integrated circuit (RFIC) and radio frequency front-end (hereinafter, 'RFFE' for convenience of description) circuit and then transmitted to the outside of the electronic device through at antenna.

According to an embodiment, an electronic device supporting a plurality of communication networks may provide a plurality of transmission (Tx) paths for signal transmission for each communication network. The plurality of transmission paths provided to support the plurality of communication networks by the electronic device may include an RFIC and/or RFFE circuit for each path. Further, each RFFE circuit may be connected with one or more antennas and, accordingly, the plurality of transmission paths may be divided into a plurality of antenna transmission paths (antenna Tx paths) corresponding to the plurality of antennas.

Different path loss may occur in the plurality of antenna transmission paths because the lengths of the transmission paths and components disposed on the transmission paths are different from each other. Further, as the antennas respectively corresponding to the antenna transmission paths are disposed in different positions on the electronic device, different antenna losses may Occur.

SUMMARY

Embodiments of the disclosure provide an electronic device capable of configuring an optimal antenna transmission path considering the path loss and/or channel environment corresponding to each antenna when an electronic device including a plurality of antenna transmission paths transmits a transmission signal and a method for configuring an antenna path of a transmission signal by the electronic device.

According to an example embodiment, an electronic device may comprise: at least one communication processor, an RF circuitry connected to the at least one communication processor, and a plurality of antennas connected to the RF circuitry. The at least one communication processor may be configured to, based on identifying a folding state of the electronic device being an open state, control the RF circuitry to provide a first RF signal corresponding to a first frequency band to a first antenna among the plurality of antennas. The at least one communication processor may be configured to, based on identifying the folding state of the electronic device being a closed state, identify whether the electronic device is gripped. The at least one communication processor may be configured to control the RF circuitry to provide a second RF signal corresponding to the first frequency band to a second antenna different from the first antenna among the plurality of antennas, based on identifying that the electronic device is gripped.

According to an example embodiment, a method of operating an electronic device including an RF circuitry and a plurality of antennas connected to the RF circuitry may comprise controlling the RF circuitry to provide a first RF signal corresponding to a first frequency band to a first antenna among the plurality of antennas based on identifying that a folding state of the electronic device is an open state. The method of operating the electronic device may comprise, based on identifying the folding state of the electronic device being a closed state, identifying whether the electronic device is gripped. The method of operating the electronic device may comprise controlling the RF circuitry to provide a second RF signal corresponding to the first frequency band to a second antenna different from the first antenna among the plurality of antennas, based on identifying that the electronic device is gripped.

According to an example embodiment, a non-transitory computer-readable storage medium may store instructions that, when executed by at least one processor, cause an electronic device to perform at least one operation. The at least one operation may comprise controlling the RF circuitry to provide a first RF signal corresponding to a first frequency band to a first antenna among the plurality of antennas based on identifying that a folding state of the electronic device is an open state. The at least one operation may comprise, based on identifying the folding state of the electronic device being a closed state, identifying whether the electronic device is gripped. The at least one operation may comprise controlling the RF circuitry to provide a second RF signal corresponding to the first frequency band to a second antenna different from the first antenna among the plurality of antennas, based on identifying that the electronic device is gripped.

According to an example embodiment, an electronic device may comprise at least one communication processor, a camera, an RF circuitry connected to the at least one communication processor, and a plurality of antennas connected to the RF circuitry. The at least one communication processor may be configured to, based on identifying that the camera is in an off state, control the RF circuitry to provide a first RF signal corresponding to a first frequency band to a first antenna among the plurality of antennas. The at least one communication processor may be configured to control the RF circuitry to provide a second RF signal corresponding to the first frequency band to a second antenna different from the first antenna among the plurality of antennas, based on identifying that the camera is changed from the off state to an on state.

According to an example embodiment, a method of operating an electronic device including a camera, an RF circuitry, and a plurality of antennas connected to the RF circuitry may comprise controlling the RF circuitry to provide a first RF signal corresponding to a first frequency band to a first antenna among the plurality of antennas based on identifying that the camera is in an off state. The method of operating the electronic device may comprise controlling the RF circuitry to provide a second RF signal corresponding to the first frequency band to a second antenna different from the first antenna among the plurality of antennas, based on identifying that the camera is changed from the off state to an on state.

According to an example embodiment, a non-transitory computer-readable storage medium may store instructions that, when executed by at least one processor, cause an electronic device to perform at least one operation. The at least one operation may comprise controlling the RF circuitry of the electronic device to provide a first RF signal corresponding to a first frequency band to a first antenna among the plurality of antennas based on identifying that the camera is in an off state. The at least one operation may comprise controlling the RF circuitry to provide a second RF signal corresponding to the first frequency band to a second antenna different from the first antenna among the plurality of antennas, based on identifying that the camera is changed from the off state to an on state.

According to an example embodiment, an electronic device may comprise at least one communication processor, an RF circuitry connected to the at least one communication processor, and a plurality of antennas connected to the RF circuitry. The at least one communication processor may be configured to control the RF circuitry to provide a first RF signal corresponding to a first sub frequency of a first frequency band to a first antenna among the plurality of antennas. The at least one communication processor may be configured to identify whether at least one first parameter associated with the first antenna and at least one second parameter associated with the second antenna meet an antenna change condition, wherein the condition may be set corresponding to the first sub frequency of the first frequency band. The at least one communication processor may be configured to control the RF circuitry to provide a second RF signal corresponding to the first sub frequency of the first frequency band to a second antenna different from the first antenna among the plurality of antennas, based on the at least one first parameter and the at least one second parameter meeting the condition.

According to an example embodiment, a method of operating an electronic device including an RF circuitry and a plurality of antennas connected to the RF circuitry may comprise controlling the RF circuitry to provide a first RF signal corresponding to a first sub frequency of a first frequency band to a first antenna among the plurality of antennas. The method of operating the electronic device may include identifying whether at least one first parameter associated with the first antenna and at least one second parameter associated with the second antenna meet an antenna change condition, wherein the condition may be set corresponding to the first sub frequency of the first frequency band. The method of operating the electronic device may comprise controlling the RF circuitry to provide a second RF signal corresponding to the first sub frequency of the first frequency band to a second antenna different from the first antenna among the plurality of antennas, based on the at least one first parameter and the at least one second parameter meeting the condition.

According to an example embodiment, a non-transitory computer-readable storage medium may store instructions that, when executed by at least one processor, cause an electronic device to perform at least one operation. The at least one operation may comprise controlling the RF circuitry of the electronic device to provide a first RF signal corresponding to a first sub frequency of a first frequency band to a first antenna among the plurality of antennas of the electronic device. The at least one operation may comprise identifying whether at least one first parameter associated with the first antenna and at least one second parameter associated with the second antenna meet an antenna change condition, wherein the condition may be set corresponding to the first sub frequency of the first frequency band. The at least one operation may comprise controlling the RF circuitry to provide a second RF signal corresponding to the first sub frequency of the first frequency band to a second antenna different from the first antenna among the plurality of antennas, based on the at least one first parameter and the at least one second parameter meeting the condition.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
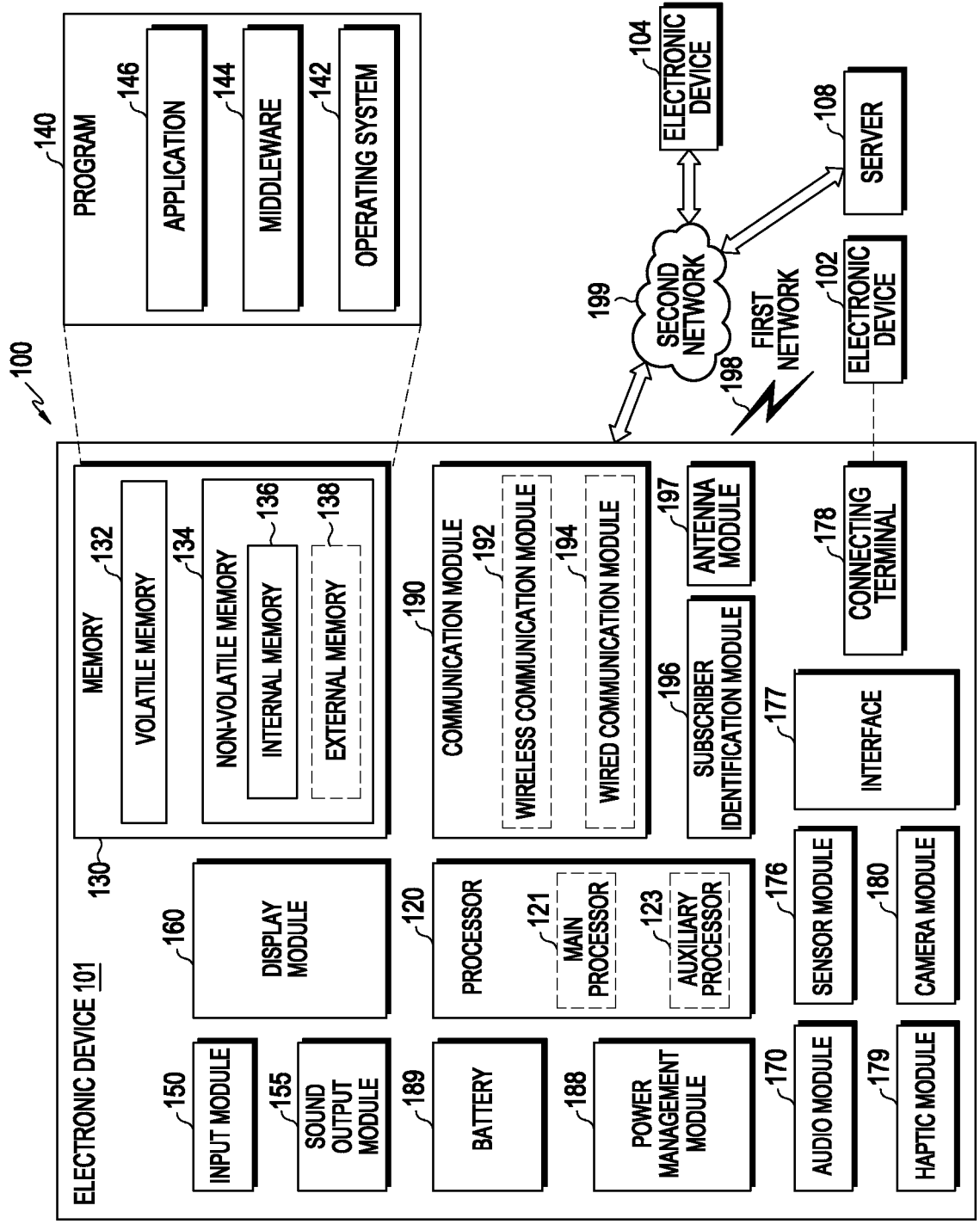
FIG. 1 is a block diagram illustrating an example electronic device in a network environment according to various embodiments.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
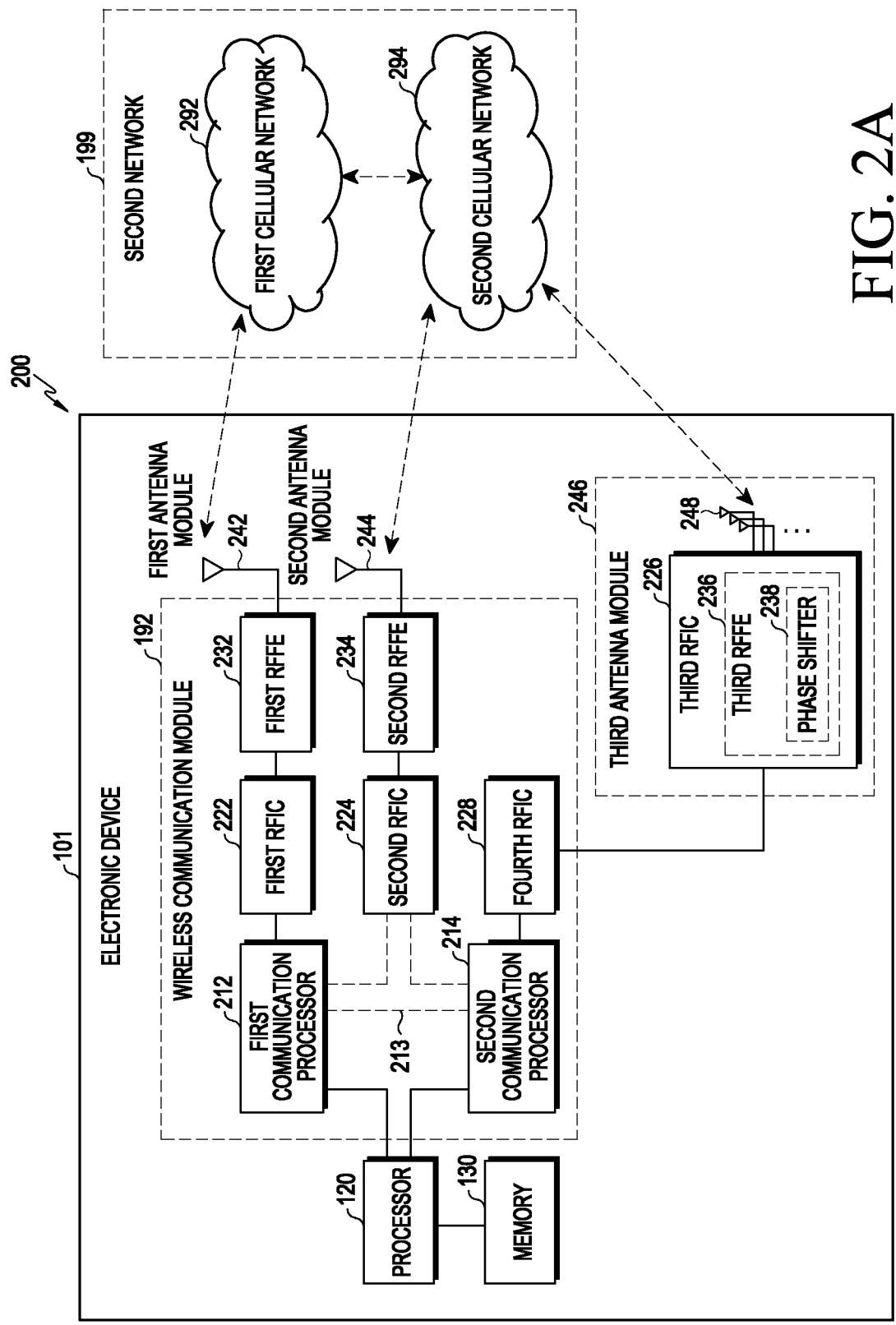
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 (each of the antenna modules including at least one antenna), and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel According to an embodiment, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
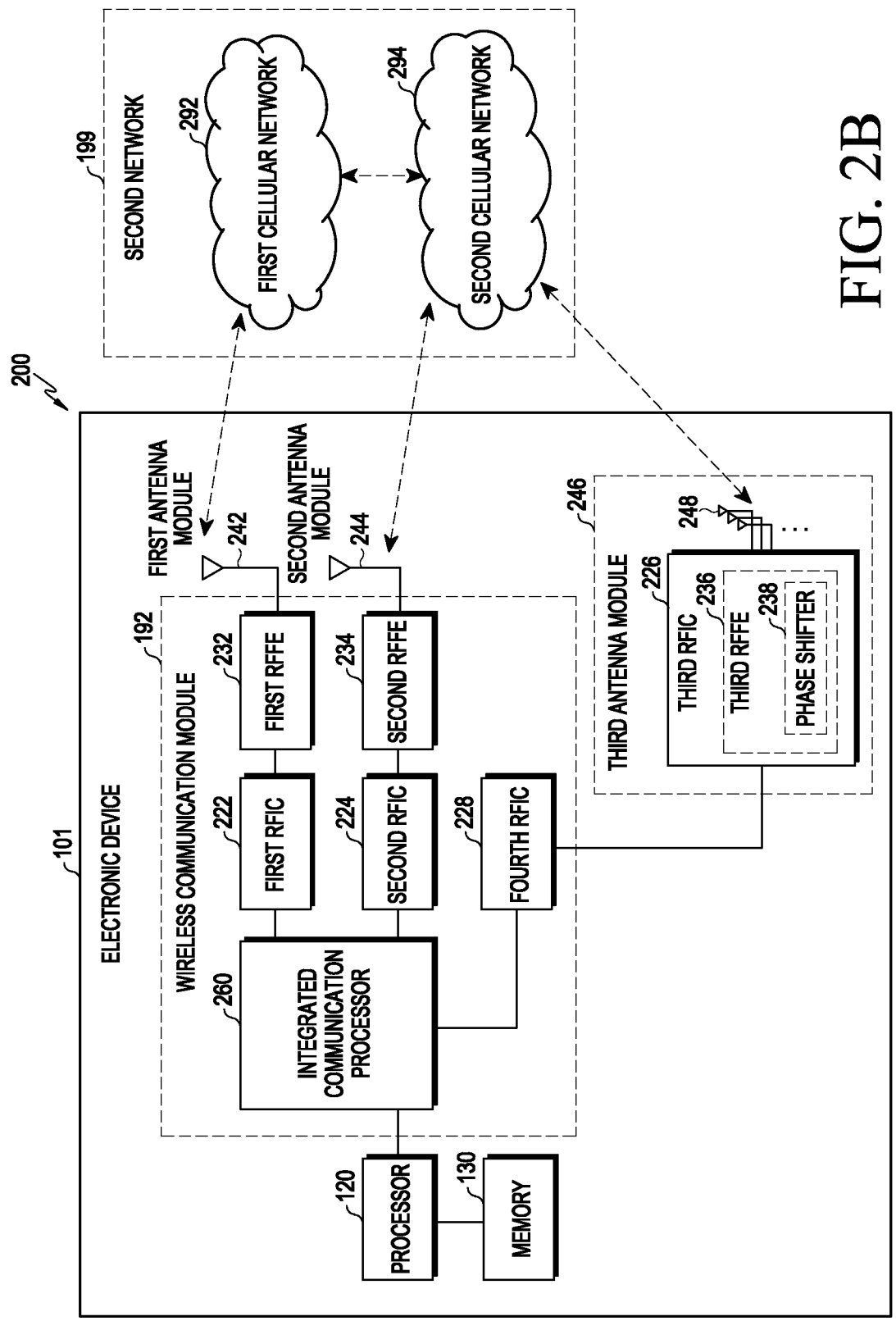
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor 260 may support all of the functions for communication with the first cellular network 292 and the second cellular network 294.

As described above, at least one of the processor 120, the first communication processor 212, the second communication processor 214, or the integrated communication processor 260 may be implemented as a single chip or a single package. In this case, the single chip or single package may include a memory (or storage means) storing instructions that cause at least some of operations performed according to an embodiment and a processing circuit (or operation circuit, but the term is not limited) for executing instructions.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RI-PE 232 and/or the second RI-PE 234, and may transmit the converted signal to one of the first RFFE 232 and the second RFFE 234. According to an embodiment, the first RI-PE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
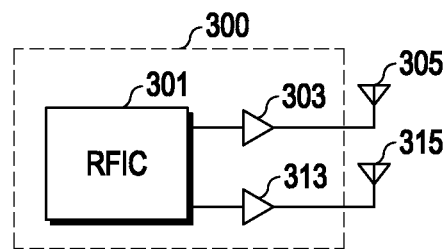
FIG. 3A is a diagram illustrating an example change of transmission antennas according to various embodiments.

FIG. 3A is a diagram illustrating an example change of transmission antennas according to various embodiments.

According to an embodiment, an RF circuitry 300 of an electronic device 101 may include an RFIC 301 (e.g., the first RFIC 222, the second RFIC 224, the third RFIC 226, and/or the fourth RFIC 228) and/or a plurality of PAs 303 and 313. It will be appreciated by one of ordinary skill in the art that the plurality of PAs 303 and 313 may be included in at least one RFFE (e.g., the first RFFE, 232, the second RFFE 234, and/or the third RFFE 236). A first antenna 305 may be connected to the first PA 303, and a second antenna 315 may be connected to the second PA 313. For example, an RF signal may be provided to the first antenna 305 through the first PA 303. An RF path to the first antenna 305 through the first PA 303 may be referred to as a first RF path. For example, an RF signal may be provided to the second antenna 315 through the second PA 313. An RF path to the second antenna 315 through the second PA 313 may be referred to as a second RF path. An RF path may refer, for example, to a path to which an RF signal is applied and may refer, for example, to at least some of a plurality of pieces of hardware associated with the path.

According to an embodiment, the electronic device 101 (e.g., the first communication processor 212 of FIG. 2A, the second communication processor 214 of FIG. 2A, and/or the integrated communication processor 260 of FIG. 2B) may support the function of changing transmission antennas. The electronic device 101 may determine to provide the RF signal through the first RF path, for example. In this case, the electronic device 101 may provide the RF signal to the first PA 303. Thus, the RF signal amplified by the PA 303 may be provided to the first antenna 305. For example, the electronic device 101 may identify that a condition for changing an RF path is met. For example, when a first indicator indicating at least one performance corresponding to a first RF path is worse than a second indicator indicating at least one performance corresponding to a second RF path (or when the first indicator and the second indicator meet a preset condition), the electronic device 101 may change the RF path from the first RF path to the second RF path. There are no limitations on the preset condition associated with the first indicator and the second indicator. The electronic device 101 (e.g., a communication processor (e.g., the first communication processor 212, the second communication processor 214, or the integrated communication processor 260)) may change the RF path from the first RF path to the second RF path by controlling at least part of the RF circuitry 300. Accordingly, the RF signal may be provided to the second PA 313. The RF signal amplified by the second PA 313 may be provided to the second antenna 315. As described above, the transmission antenna for the RF signal may be changed from the first antenna 305 to the second antenna 315. This may be referred to as transmission antenna hopping. For example, when dual connectivity (e.g., EN-DC but not limited) is supported, the electronic device 101 may include PAs (e.g., the PAs 303 and 313) supporting the same frequency band. In this case, the electronic device 101 may perform transmission antenna hopping using the plurality of PAs 303 and 313. For example, the PAs 303 and 313 may support a middle band (MB)/high band (HB). In this case, the electronic device 101 may perform transmission antenna hopping for the RF signal of MB/HB.

Figure 3B:
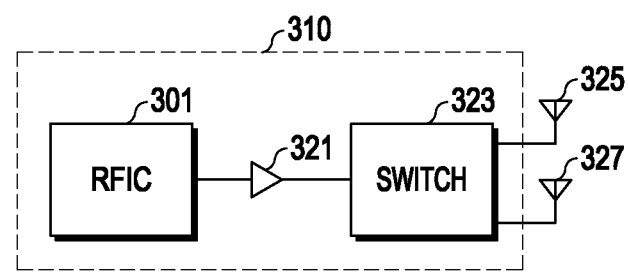
FIG. 3B is a diagram illustrating an example change of transmission antennas according to various embodiments.

FIG. 3B is a diagram illustrating an example change of transmission antennas according to various embodiments.

According to an embodiment, the RF circuitry 310 of the electronic device 101 may include an RFIC 301 (e.g., the first RFIC 222, the second RFIC 224, the third RFIC 226, and/or the fourth RFIC 228), a PA 321, and/or a switch 323. The switch 323 may selectively connect either the first antenna 325 or the second antenna 327 to the PA 321. For example, the switch 323 may operate based on the control of the communication processors 212, 214, and/or 260 and/or the RFIC 301, but is not limited thereto. It will be appreciated by one of ordinary skill in the art that the switch 323 may be implemented as SPnT, but the type is not limited. For example, in the embodiment of FIG. 3B, the switch 323 may be controlled so that the RF signal is provided to the first antenna 325 through the PA 321. This may be referred to as a first RF path. For example, the switch 323 may be controlled so that the RF signal is provided to the second antenna 327 through the PA 321. This may be referred to as a second RF path.

According to an embodiment, the electronic device 101 (e.g., the communication processor 212, 214, and/or 260) may support a function of changing a transmission antenna. The electronic device 101 may determine to provide the RF signal through the first RF path, for example. In this case, the electronic device 101 may control the switch 323 to provide an RF signal to the first PA 321. Accordingly, the RF signal amplified by the first PA 321 may be provided to the first antenna 325. For example, the electronic device 101 may identify that a condition for changing an RF path is met. For example, when a first indicator indicating at least one performance corresponding to a first RF path is worse than a second indicator indicating at least one performance corresponding to a second RF path (or when the first indicator and the second indicator meet a preset condition), the electronic device 101 may change the RF path from the first RF path to the second RF path.

In an example, the conditions associated with the first indicator and the second indicator may be conditions associated with the first received strength (which may be, RSRP, but is not limited) corresponding to the first antenna 325 and the second received strength corresponding to the second antenna 327. The electronic device 101 may be configured to measure received strengths corresponding to the antennas 325 and 327 in a designated period (e.g., 640 ms, but is not limited). The electronic device 101 may identify the received strength difference (e.g., RSRP diff current) which is a difference between the first received strength and the second received strength at the current time. Further, the electronic device 101 may identify MTPL diff which is a difference between a first maximum transmission power level (MTPL) corresponding to the first RF path and a second MTPL corresponding to the second RF path. In an example condition, the electronic device 101 may identify that the antenna change condition is met when the sum of the received strength difference (RSRP diff current) at the current time and the MTPL diff is a first threshold (referred to as high threshold for convenience of description) or more.

In an example condition, when the change degree of received strength is larger than a threshold change degree (e.g., when an abrupt received strength change is detected), the electronic device 101 may identify that the antenna change condition is met.

In an example, the electronic device 101 may identify the average received strength difference (which is referred to as RSRP average). The average may be calculated, e.g., for two or more times, and the number of the times is not limited. In an example condition, the electronic device 101 may identify that the antenna change condition is met when the sum of the average received strength difference (RSRP average) and the MTPL is a second threshold (referred to as low threshold for convenience of description) or more. The second threshold may be smaller than the first threshold, but is not limited. In an example condition, the electronic device 101 may also identify that the antenna change condition is met when a continuous received strength difference occurs. It will be appreciated by one of ordinary skill in the art that the above-described antenna change conditions are merely examples, and whether the antenna change condition is met may be determined based on the respective received strengths of the antennas, average of the differences, MTPLs, and/or MTPL difference, and whether the antenna change conditions are met may also be determined based on at least one parameter that replaces the above-described parameters or is added.

For example, upon identifying that the antenna change condition is met, the electronic device 101 (e.g., a communication processor (e.g., the first communication processor 212, the second communication processor 214, or the integrated communication processor 260)) may change the RF path from the first RF path to the second RF path by controlling the switch 323. Accordingly, the RF signal amplified by the PA 321, which used to be provided to the first antenna 325, may be provided to the second antenna 327. As described above, the transmission antenna for the RF signal may be changed from the first antenna 325 to the second antenna 327. This may be referred to as transmission antenna switching.

According to various embodiments, the electronic device 101 may change the transmission antenna by the transmission antenna hopping described in connection with FIG. 3A or the transmission antenna switching described in connection with FIG. 3B. In the disclosure, the operation of changing the transmission antenna may be performed, e.g., by transmission antenna hopping or by transmission antenna switching.

Figure 4A:
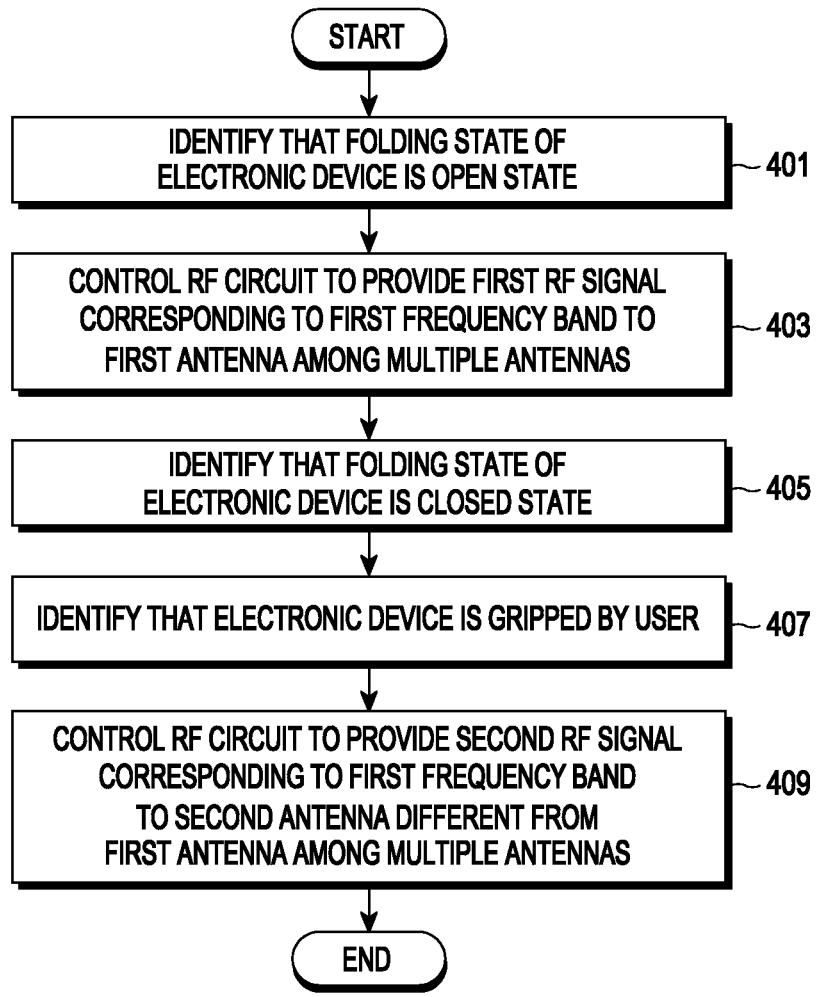
FIG. 4A is a flowchart illustrating an example method of operating an electronic device according to various embodiments.
Figure 4B:
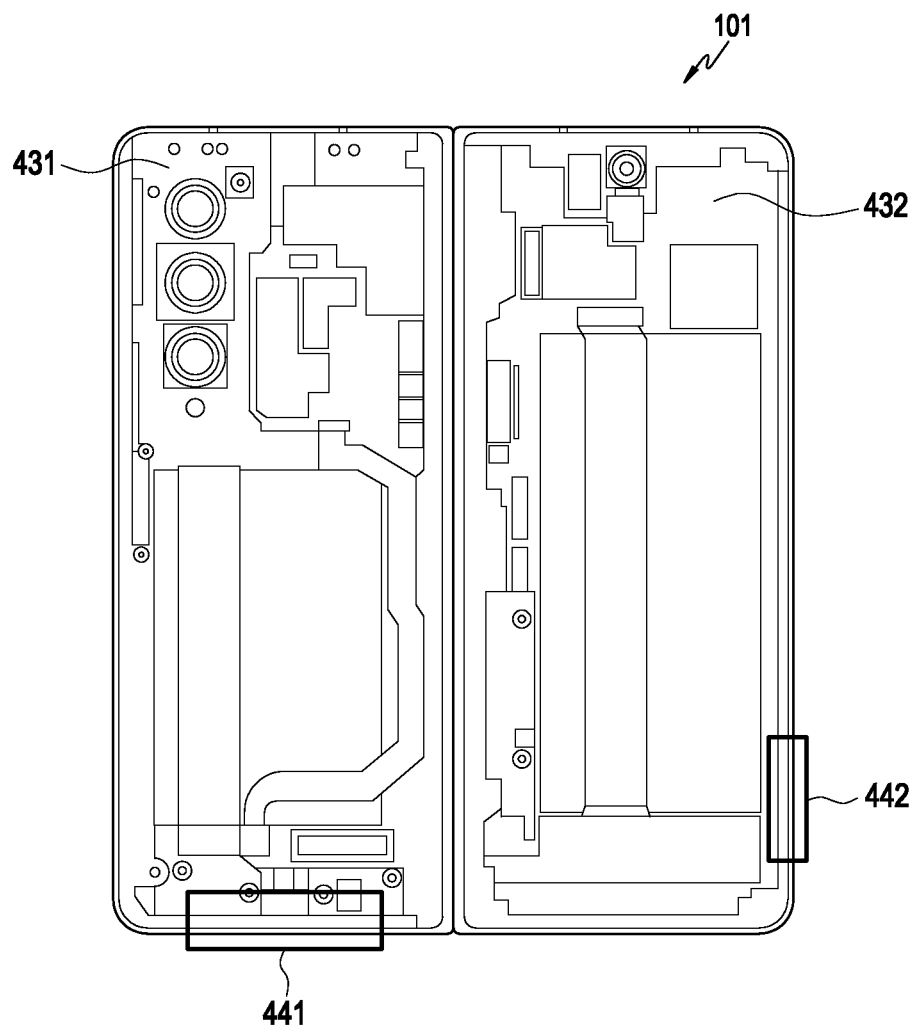
FIG. 4B is a diagram illustrating a housing of an electronic device according to various embodiments.

FIG. 4A is a flowchart illustrating an example method of operating an electronic device according to various embodiments. FIG. 4A is described with reference to FIG. 4B. FIG. 4B is a diagram illustrating a housing of an electronic device according to various embodiments.

Referring to FIG. 4A, the electronic device 101 (e.g., the first communication processor 212 of FIG. 2A, the second communication processor 214 of FIG. 2A, and/or the integrated communication processor 260 of FIG. 2B) may identify that the folding state of the electronic device 101 is an open state in operation 401. For example, the communication processor 212, 214, and/or 260 may receive information associated with the folding state of the processor 120 (e.g., application processor). For example, referring to FIG. 4B, the electronic device 101 may include a first housing 431 and a second housing 432. The first housing 431 and the second housing 432 may be rotated by a hinge structure (e.g., the hinge structure 458 of FIG. 4C). For example, when one surface of the first housing 431 and one surface of the second housing 432 face in substantially the same direction, the folding state of the electronic device 101 may be referred to as an open state. For example, when one surface of the first housing 431 and one surface of the second housing 432 substantially face each other, the folding state of the electronic device 101 may be referred to as a closed state. The electronic device 101 may identify whether the folding state of the electronic device 101 is the open state, closed state, or half-closed state. For example, the processor 120 may identify the folding state based on sensing data from at least one sensor (e.g., hall sensor) for determining whether it folds. The processor 120 may transfer the identified folding state information to the communication processor 212, 214, and/or 260, and the communication processor 212, 214, and/or 260 may identify the folding state of the electronic device 101 based on the received information.

Referring back to FIG. 4A, in operation 403, the electronic device 101 may control the RF circuitry (e.g., the RF circuitry 300 of FIG. 3A or the RF circuitry 310 of FIG. 3B) to provide a first RF signal corresponding to a first frequency band to a first antenna among the plurality of antennas based on the folding state being the open state. For example, the antenna available for each folding state may be set among the antennas available corresponding to the first frequency band. For example, the antenna corresponding to the folding state being the open state among the antennas available corresponding to the first frequency band may be the first antenna. For example, the antenna corresponding to the folding state being the closed state among the antennas available corresponding to the first frequency band may be the second antenna. The antenna corresponding to the open state and the antenna corresponding to the closed state are described below. According to an embodiment, in operation 405, the electronic device 101 may identify that the folding state of the electronic device 101 changes from the open state to the closed state. the electronic device 101 may identify that the folding state of the electronic device 101 being the closed state. For example, as described above, the processor 120 may identify that the folding state changes from the open state to the closed state based on information from at least one sensor. The processor 120 may provide information indicating that the folding state is the closed state to the communication processor 212, 214, and/or 260. The communication processor 212, 214, and/or 260 may identify that the folding state of the electronic device 101 changes from the open state to the closed state based on information from the processor 120.

According to an embodiment, in operation 407, the electronic device 101 may identify that the electronic device 101 is gripped by the user. For example, referring to FIG. 4B, the electronic device 101 may include at least one grip sensor 441 and 442. For example, the processor 120 may identify whether the electronic device 101 is gripped based on information sensed by at least one grip sensor 441 and 442. In an example, upon identifying that a grip is identified by all of the grip sensors 441 and 442, it may be determined that the electronic device 101 is gripped, but this is an example and is not limited. The processor 120 may provide information for identifying whether it is gripped to the communication processor 212, 214, and/or 260. The communication processor 212, 214, and/or 260 may identify whether the electronic device 101 is gripped based on information from the processor 120. Meanwhile, this is an example, and the communication processor 212, 214, and/or 260 may identify whether it is gripped based on an indicator associated with the strength of the reflected wave, such as voltage standing wave ratio (VSWR), without information from the application processor. For example, it will be appreciated by one of ordinary skill in the art that whether it is a free space environment, whether an object is detected, and/or the type of the object may be identified based on the VSWR, and the identifying method is not limited.

Referring back to FIG. 4A, according to an embodiment, the electronic device 101 may control the RF circuitry to provide the second RF signal corresponding to the first frequency band to the second antenna different from the first antenna among the plurality of antennas, based on the electronic device 101 being gripped, in operation 409. The second RF signal may refer, for example, to an RF signal subsequent to the first RF signal in time series, and the first RF signal and the second RF signal may be based on the first frequency band. Here, control of the RF circuitry may be, e.g., control corresponding to transmission antenna hopping or control corresponding to transmission antenna switching. As described above, for example, the second antenna may be an antenna corresponding to the closed state among the antennas available corresponding to the first frequency band. As described above, the electronic device 101 may change the transmission antenna from the first antenna corresponding to the open state to the antenna corresponding to the closed state based on transmission antenna hopping or transmission antenna switching. Meanwhile, changing the transmission antenna from the first antenna to the second antenna based on the electronic device 101 being gripped is merely an example, and a change of transmission antennas may also be performed without determining whether it is gripped. For example, the electronic device 101 may change the transmission antenna from the first antenna corresponding to the open state to the second antenna corresponding to the closed state based on a change of the folding state from the open state to the closed state. As described above, in the open state, the first antenna which has relatively high performance may be used and, in the closed state, the second antenna which has relatively high performance may be used as the transmission antenna. Hereinafter, a transmission antenna in a foldable electronic device is described.

Figure 4C:
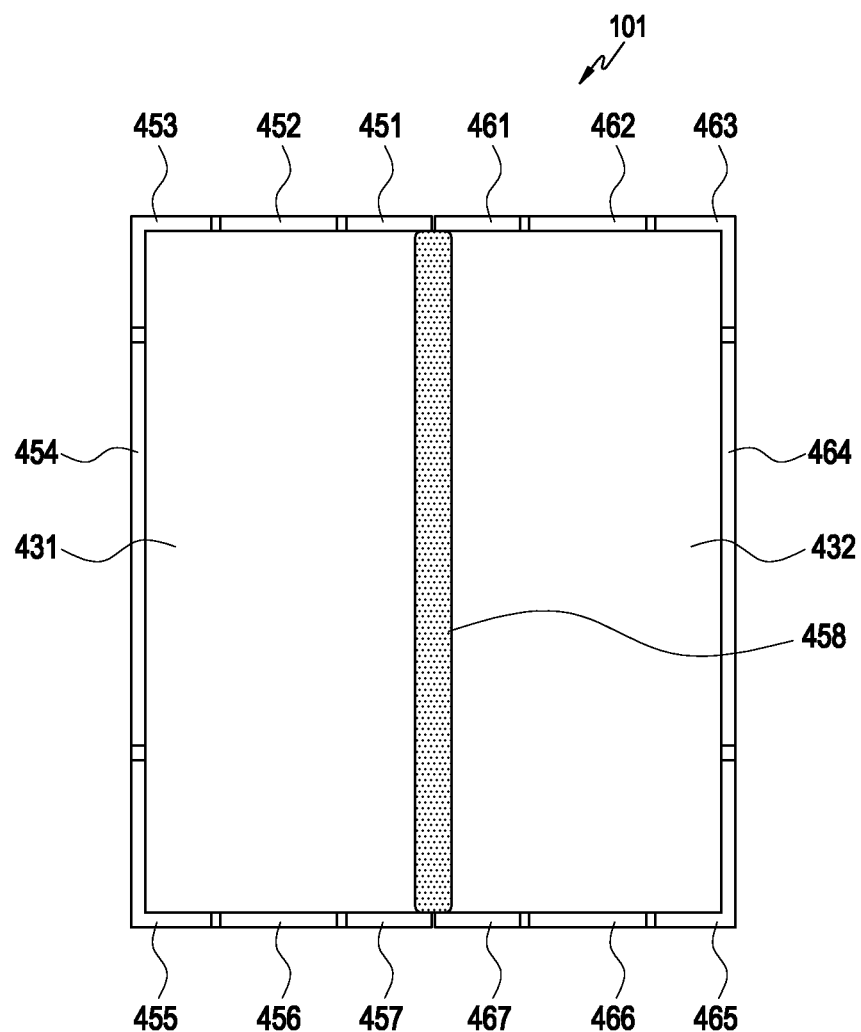
FIG. 4C is a diagram illustrating antennas in an open state of an electronic device according to various embodiments.
Figure 4D:
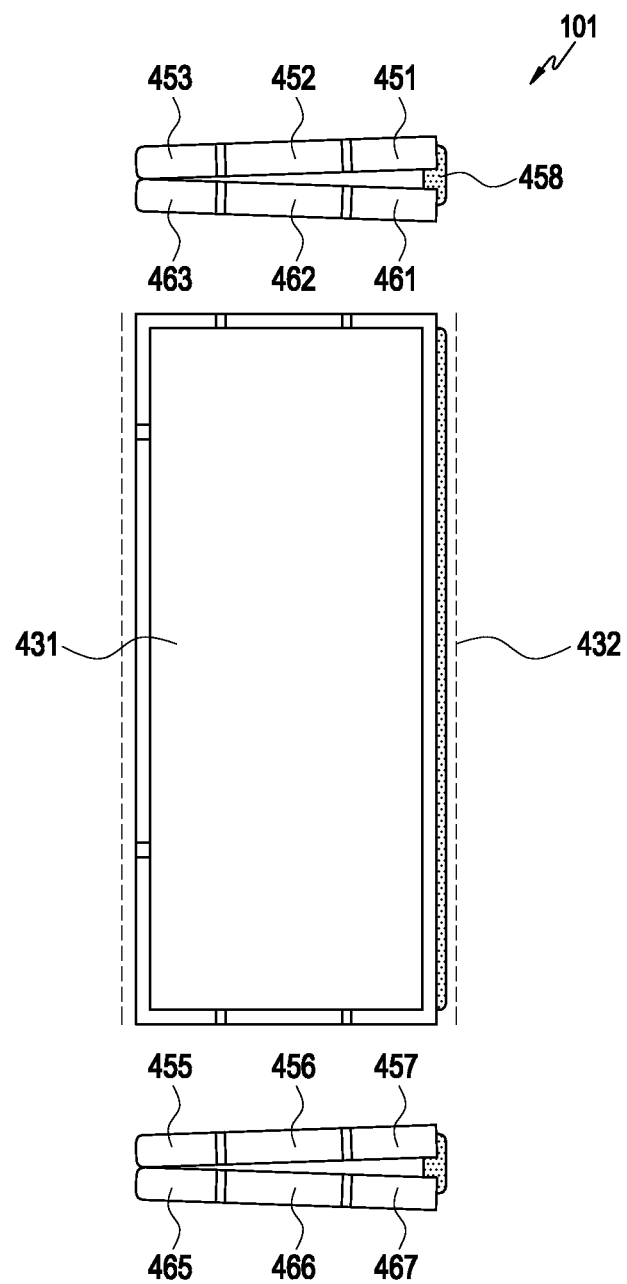
FIG. 4D is a diagram illustrating antennas in a closed state of an electronic device according to various embodiments.
Figure 4E:
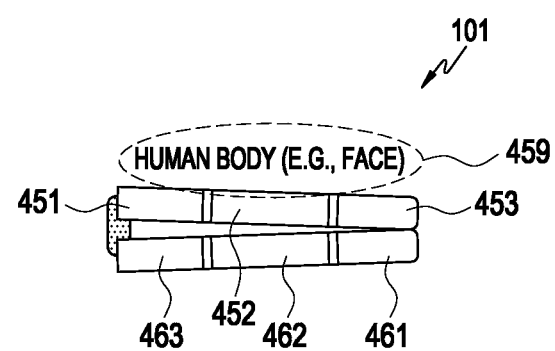
FIG. 4E is a diagram illustrating human body contact in a closed state according to various embodiments.

FIG. 4C is a diagram illustrating antennas in an open state of an electronic device according to various embodiments. FIG. 4D is a diagram illustrating antennas in a closed state of an electronic device according to various embodiments. FIG. 4E is a diagram illustrating human body contact in a closed state according to various embodiments.

Referring to FIG. 4C, antennas 451, 452, 453, 454, 455, 456, and 457 may be disposed on the first housing 431 of the electronic device 101. Antennas 461, 462, 463, 464, 465, 466, and 467 may be disposed on the second housing 432 of the electronic device 101. The antennas 451, 452, 453, 454, 455, 456, and 457 and/or the antennas 461, 462, 463, 464, 465, 466, and 467 may be segmented antennas, but their types are not limited. The first housing 431 and the second housing 432 may be connected to the hinge structure 458. The hinge structure 458 may include, e.g., a rotatable structure. Accordingly, at least one housing may be rotated about the hinge structure 458 as an axis so that the electronic device 101 may be folded as shown in FIG. 4D. The folding state of the electronic device 101 in FIG. 4D may be referred to as a closed state.

Referring back to FIG. 4C, the electronic device 101 may determine to transmit an RF signal of a first frequency band, for example. The electronic device 101 may determine an antenna 455 among antennas corresponding to the first frequency band, as the transmission antenna. The antenna 455 may be, e.g., a basic (or default) transmission antenna corresponding to the first frequency band. For example, when the folding state is the open state, the antenna 455 may have better performance than the other antennas in the first frequency band. Accordingly, the antenna 455 may be the basic transmission antenna. Meanwhile, it will be appreciated by one of ordinary skill in the art that even in the open state, the electronic device 101 may identify whether the antenna change condition is met, and that the transmission antenna may be changed based on the satisfaction of the antenna change condition.

According to an embodiment, the folding state of the electronic device 101 may be changed from the open state to the closed state. Referring to FIG. 4D, in the closed state, the antennas 451, 452, and 453 disposed on an upper side of the first housing 431 may approach the antennas 461, 462, and 463 disposed on an upper side of the second housing 432. In the closed state, the antennas 455, 456, and 457 disposed on a lower side of the first housing 431 may approach the antennas 465, 466, and 467 disposed on a lower side of the second housing 432. The close disposition of antennas may affect antenna performance. In particular, the distance between the antennas 455 and 465 may be smaller than the distance between other antennas. Accordingly, performance degradation may occur. Accordingly, if the antenna 455 used in the open state is continuously used, communication performance may deteriorate. Accordingly, it may be desirable to change the transmission antenna. For example, the electronic device 101 may use an antenna (e.g., 451 or 461) corresponding to the closed state as the transmission antenna. In the closed state, the distance between the antennas 451 and 461 may be larger than the distance between the other antennas. Accordingly, the antenna 451 having a relatively large distance between the antennas 451 and 461 may be determined as the transmission antenna, but this is an example and the transmission antenna corresponding to the closed state is not limited. Since there is a possibility that the human body may come into contact with the lower antennas 455, 456, and 457 by the grip, the antenna 451 disposed on the upper side may be determined as the transmission antenna, but is not limited thereto. For example, it may be required that the distance between the antennas be equal to or larger than a predetermined distance (e.g., 0.4 mm) to ensure good antenna performance. Accordingly, any antenna for which the distance from the adjacent antenna in the closed state is the predetermined distance (e.g., 0.4 mm) or more may be used as the transmission antenna in the closed state, the manner of setting and/or selecting the transmission antenna is not limited. For example, the antenna 453 and the antenna 451 may be used in MB/HB. Accordingly, in the closed state, the antenna 453 may be used as the transmission antenna corresponding to MB/HB. In the open state, the antenna 451 may be used as the transmission antenna corresponding to MB/HB. Although not shown, the folding state of the electronic device 101 may be a half-closed state. The half-closed state may refer, for example, to a state in which the angle between the first housing 431 and the second housing 432 has a certain value between the open state and the closed state, but is not limited. In the half-closed state, the electronic device 101 may determine a transmission antenna based on the distance between the antennas. For example, in the half-closed state, the electronic device 101 may identify the transmission antenna corresponding to the corresponding angle. For example, the transmission antenna corresponding to the angle between the housings 431 and 432 may be set, and the electronic device 101 may identify the transmission antenna corresponding to a specific angle. Or, the electronic device 101 may also calculate the distance between antennas at a specific angle in the half-closed state and determine the transmission antenna based on the calculation result. For example, the electronic device 101 may determine the antenna having the largest distance to the most adjacent antenna among the available antennas in a specific band, as the transmission antenna. Meanwhile, it will be appreciated by one of ordinary skill in the art that when the distance to the most adjacent antenna from the transmission antenna being used is a predetermined distance (e.g., 0.4 mm) or more in the half-closed state, the transmission antenna may be maintained.

Meanwhile, as in FIG. 4E, a human body 459 (e.g., face) may be placed close to the antenna. For example, the user may bring her body 459 close to the electronic device 101 for a call while the folding state of the electronic device 101 is the closed state. As illustrated in FIG. 4A, the electronic device 101 may change the transmission antenna when a grip on the electronic device 101 is identified. For example, in an example, the electronic device 101 may change the transmission antenna based on a change of the folding state to the closed state and identifying a grip. However, this is merely an example, and the electronic device 101 may also be configured to change the transmission antenna without identifying whether it is gripped if the folding state is changed to the closed state. Meanwhile, folding the electronic device so that the distance between the antennas 451 and 461 is larger than the distance between the antennas 453 and 463 as shown in FIG. 4D is merely an example. The electronic device 101 may also be implemented to be folded to have substantially the same distance between antennas. It will be appreciated by one of ordinary skill in the art that even in this case, the electronic device 101 may change the transmission antenna based on a change of the folding state. For example, a change of the transmission antenna to an antenna having relatively good performance may be performed when the folding state is the closed state.

Figure 4F:
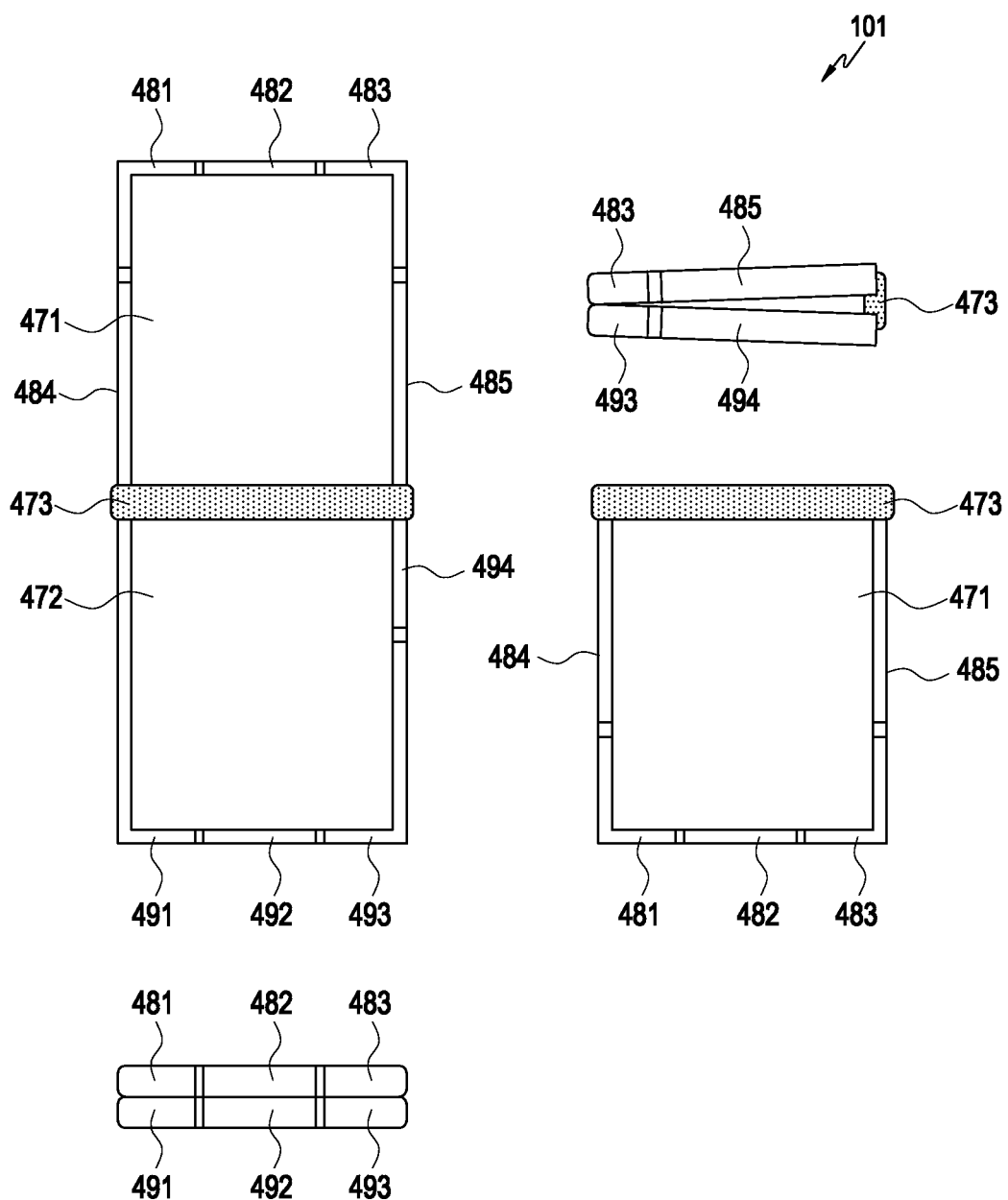
FIG. 4F is a diagram illustrating various folding states of an electronic device according to various embodiments.

FIG. 4F is a diagram illustrating various states and views of an electronic device according to various embodiments.

In contrast to the electronic device 101 being folded in the left/right direction with respect to the direction shown in the drawings in FIGS. 4C and 4D, the electronic device 101 according to the embodiment of FIG. 4F may be implemented to be folded in the upper/lower direction. The electronic device 101 may include a first housing 471 and a second housing 472. Antennas 481, 482, 483, 484, and 485 may be disposed on the first housing 471. Antennas 491, 492, 493, and 494 may be disposed on the second housing 472. The first housing 471 and the second housing 472 may be connected to the hinge structure 473. The hinge structure 473 may include a rotatable structure. Accordingly, the housing may rotate about the hinge structure 473 as an axis. Accordingly, as shown in FIG. 4F, the first housing 471 and the second housing 472 may rotate to face each other (e.g., in the upper/lower direction).

According to an embodiment, when the folding state is the open state, the electronic device 101 may use, e.g., an antenna 482 disposed on the first housing 471 as the transmission antenna. According to an embodiment, when the folding state is the closed state, the antennas 481 and 491 may substantially contact each other, antennas 482 and 492 may substantially contact each other, and the antennas 483 and 493 may substantially contact each other. For example, the distance between the antennas 482 and 492 may be less than a predetermined distance (e.g., 0.4 mm), and the performance of the antenna 482 may be degraded. Meanwhile, when the folding state is the open state, the distance between the antennas 485 and 494 may be the predetermined distance (e.g., 0.4 mm). When the folding state is the closed state, the antenna 485 may be used as the transmission antenna. For example, the antennas 483 and 493 may be antennas configured for the B41 band and/or the N41 band, but are not limited thereto. As described above, the electronic device 101 may change the transmission antenna according to the change from the open state to the closed state. Alternatively, the electronic device 101 may change the transmission antenna based on the change to the closed state and identified of a grip. Meanwhile, as in FIG. 4F, the folding of the electronic device such that the distance between the antennas 485 and 494 is relatively large is merely an example. The electronic device 101 may also be implemented to be folded to have substantially the same distance between antennas. It will be appreciated by one of ordinary skill in the art that even in this case, the electronic device 101 may change the transmission antenna based on a change of the folding state. For example, a change of the transmission antenna to an antenna having relatively good performance may be performed when the folding state is the closed state.

Figure 5A:
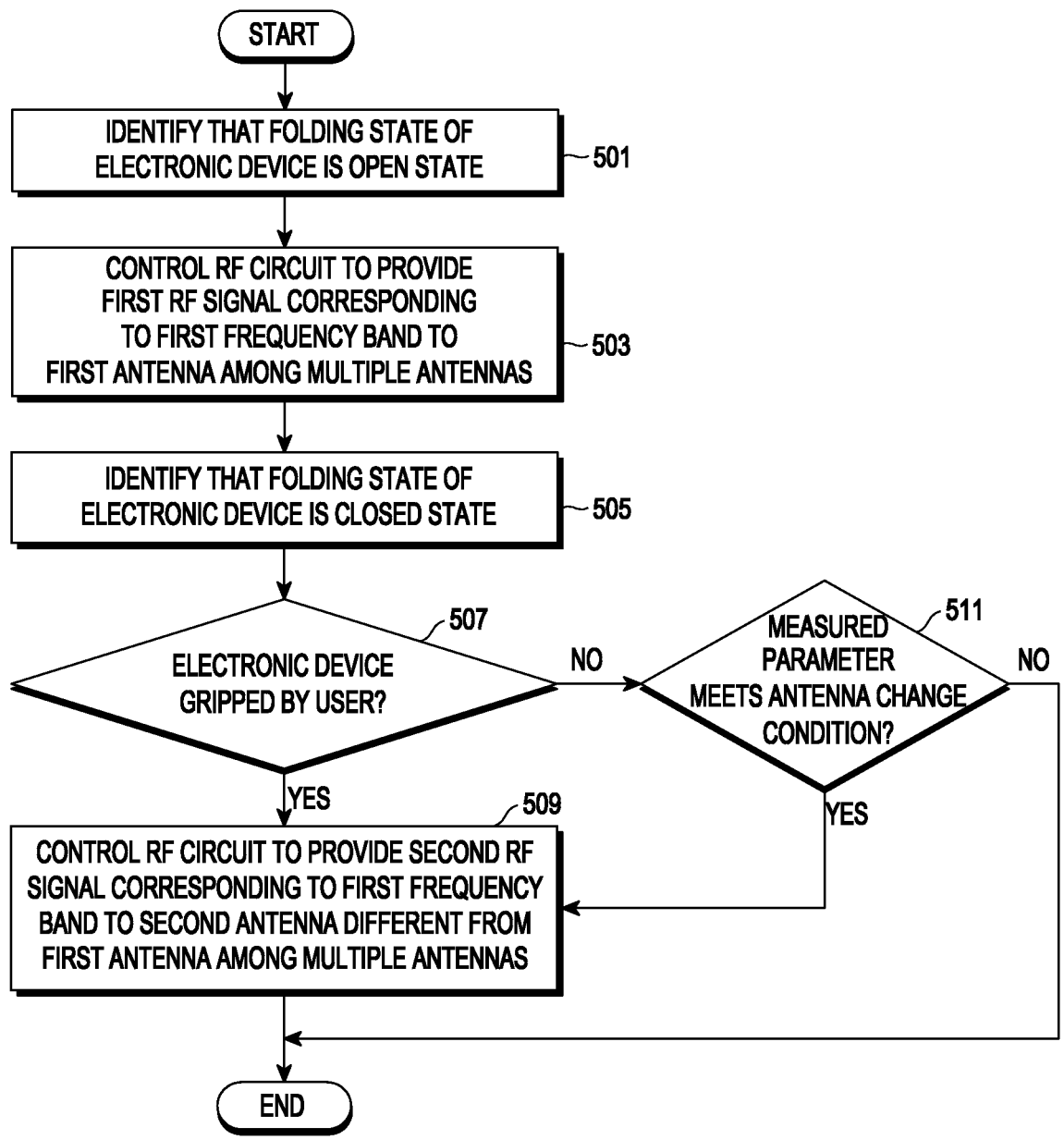
FIG. 5A is a flowchart illustrating an example method of operating an electronic device according to various embodiments.

FIG. 5A is a flowchart illustrating an example method of operating an electronic device according to various embodiments.

According to an embodiment, the electronic device 101 (e.g., the first communication processor 212 of FIG. 2A, the second communication processor 214 of FIG. 2A, and/or the integrated communication processor 260 of FIG. 2B) may identify that the folding state of the electronic device 101 is an open state in operation 501. For example, the communication processor 212, 214, and/or 260 may receive information about the folding state (e.g., information indicating the open state) of the electronic device 101 from the application processor (e.g., the processor 120), but this is merely an example, and the manner in which the communication processor 212, 214, and/or 260 identifies the folding state is not limited. In another example, the communication processor 212, 214, and/or 260 may directly receive sensing data from the sensor.

In operation 503, the electronic device 101 may control the RF circuitry (e.g., the RF circuitry 300 of FIG. 3A or the RF circuitry 310 of FIG. 3B) to provide a first RF signal corresponding to a first frequency band to a first antenna among the plurality of antennas. Here, the first antenna may be, e.g., a transmission antenna corresponding to the open state, but is not limited thereto.

In operation 505, the electronic device 101 may identify that the folding state of the electronic device 101 changes from the open state to the closed state. The electronic device 101 may identify that the folding state of the electronic device 101 being the closed state. For example, the communication processor 212, 214, and/or 260 may receive information about the folding state (e.g., information indicating the closed state) of the electronic device 101 from the application processor (e.g., the processor 120), but this is an example, and the manner in which the communication processor 212, 214, and/or 260 identifies the folding state is not limited.

According to an embodiment, in operation 507, the electronic device 101 may identify whether the electronic device 101 is gripped by the user. The electronic device 101 may control the RF circuitry to provide the second RF signal corresponding to the first frequency band to the second antenna different from the first antenna among the plurality of antennas, based on the electronic device 101 being identified to be gripped (yes in 507), in operation 509. For example, operation 509 may be a forced transmission antenna change. The second antenna may be, e.g., a transmission antenna corresponding to the closed state, but is not limited thereto. Upon identifying that the electronic device 101 is gripped, the electronic device 101 may perform a transmission antenna change (e.g., transmission antenna hopping or transmission antenna switching) without determining whether the measured parameter meets the antenna change condition, and this may be referred to as a forced antenna change. Based on being identified otherwise (no in 507), the electronic device 101 may identify whether the measured parameter meets the antenna change condition in operation 511. For example, operation 511 may be a transmission antenna change algorithm on state. When the measured parameter meets the antenna change condition (yes in 511), the electronic device 101 may control the RF circuitry to provide the second RF signal corresponding to the first frequency band to the second antenna different from the first antenna among the plurality of antennas, in operation 509. If the measured parameter does not meet the antenna change condition (no in 511), the electronic device 101 may maintain the transmission antenna. When identified otherwise, whether to change the transmission antenna may be determined based on whether the measured parameter meets the antenna change condition, and this may be referred to as a transmission antenna change algorithm on state. Meanwhile, the state of maintaining the transmission antenna regardless of the measured parameter may be referred to as a transmission antenna change algorithm off state.

Figure 5B:
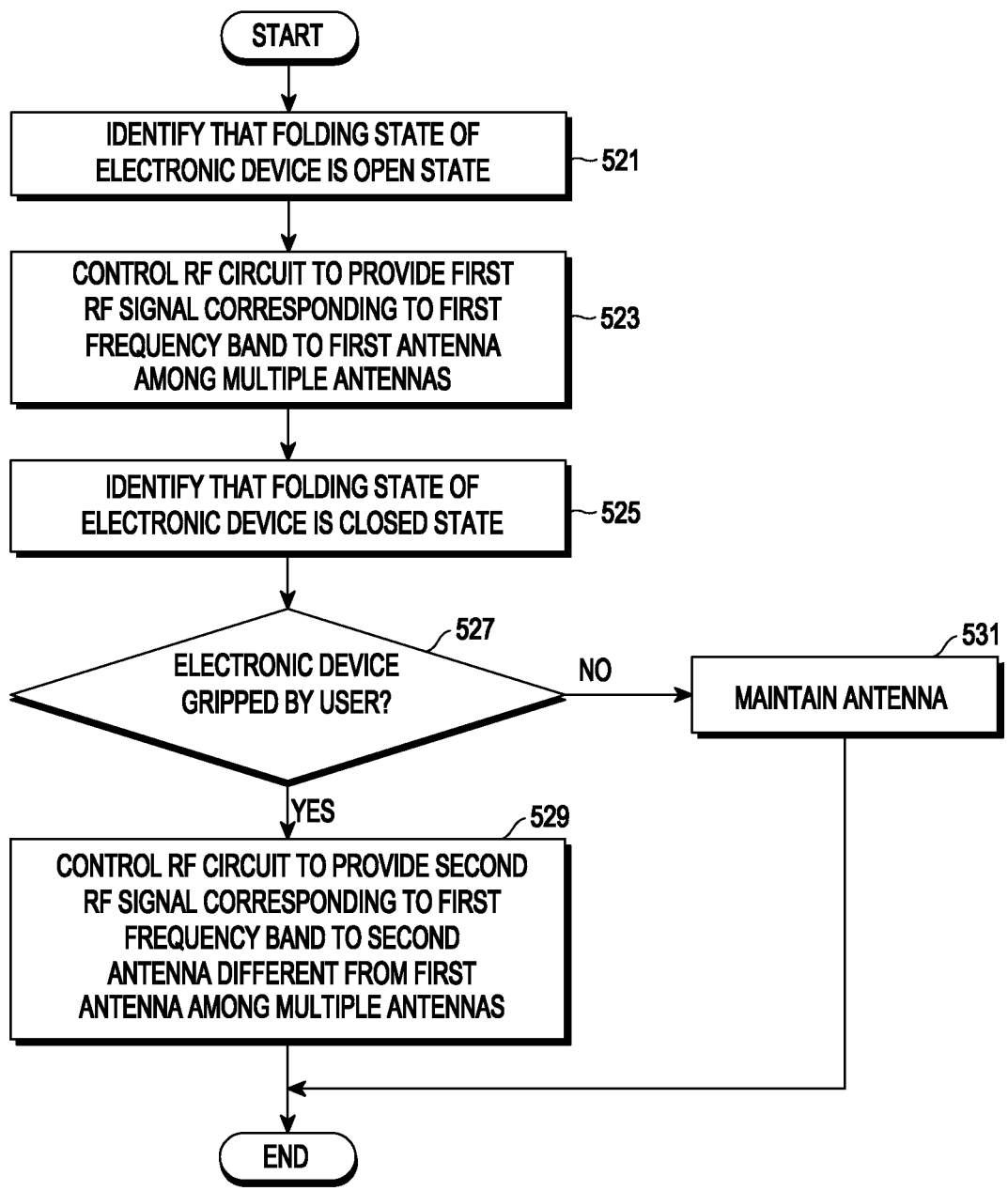
FIG. 5B is a flowchart illustrating an example method of operating an electronic device according to various embodiments.

FIG. 5B is a flowchart illustrating an example method of operating an electronic device according to various embodiments.

According to an embodiment, the electronic device 101 (e.g., the first communication processor 212 of FIG. 2A, the second communication processor 214 of FIG. 2A, and/or the integrated communication processor 260 of FIG. 2B) may identify that the folding state of the electronic device 101 is an open state in operation 521. In operation 523, the electronic device 101 may control the RF circuitry (e.g., the RF circuitry 300 of FIG. 3A or the RF circuitry 310 of FIG. 3B) to provide a first RF signal corresponding to a first frequency band to a first antenna among the plurality of antennas. Here, the first antenna may be, e.g., a transmission antenna corresponding to the open state, but is not limited thereto. In operation 525, the electronic device 101 may identify that the folding state of the electronic device 101 changes from the open state to the closed state. The electronic device 101 may identify that the folding state of the electronic device 101 being the closed state. For example, the communication processor 212, 214, and/or 260 may receive information about the folding state (e.g., information indicating the closed state) of the electronic device 101 from the application processor (e.g., the processor 120), but this is an example, and the manner in which the communication processor 212, 214, and/or 260 identifies the folding state is not limited.

According to an embodiment, in operation 527, the electronic device 101 may identify whether the electronic device 101 is gripped by the user. The electronic device 101 may control the RF circuitry to provide the second RF signal corresponding to the first frequency band to the second antenna different from the first antenna among the plurality of antennas, based on the electronic device 101 being identified to be gripped (yes in 527), in operation 529. Based on being identified as not gripped (no in 527), the electronic device 101 may maintain the antenna in operation 531. For example, operation 531 may be a transmission antenna change algorithm off state. While whether to change the transmission antenna is determined depending on whether the measured parameter meets the antenna change condition when not gripped in FIG. 5A, it may be implemented that the antenna is maintained regardless of the measured parameter when not gripped in FIG. 5B.

Figure 6:
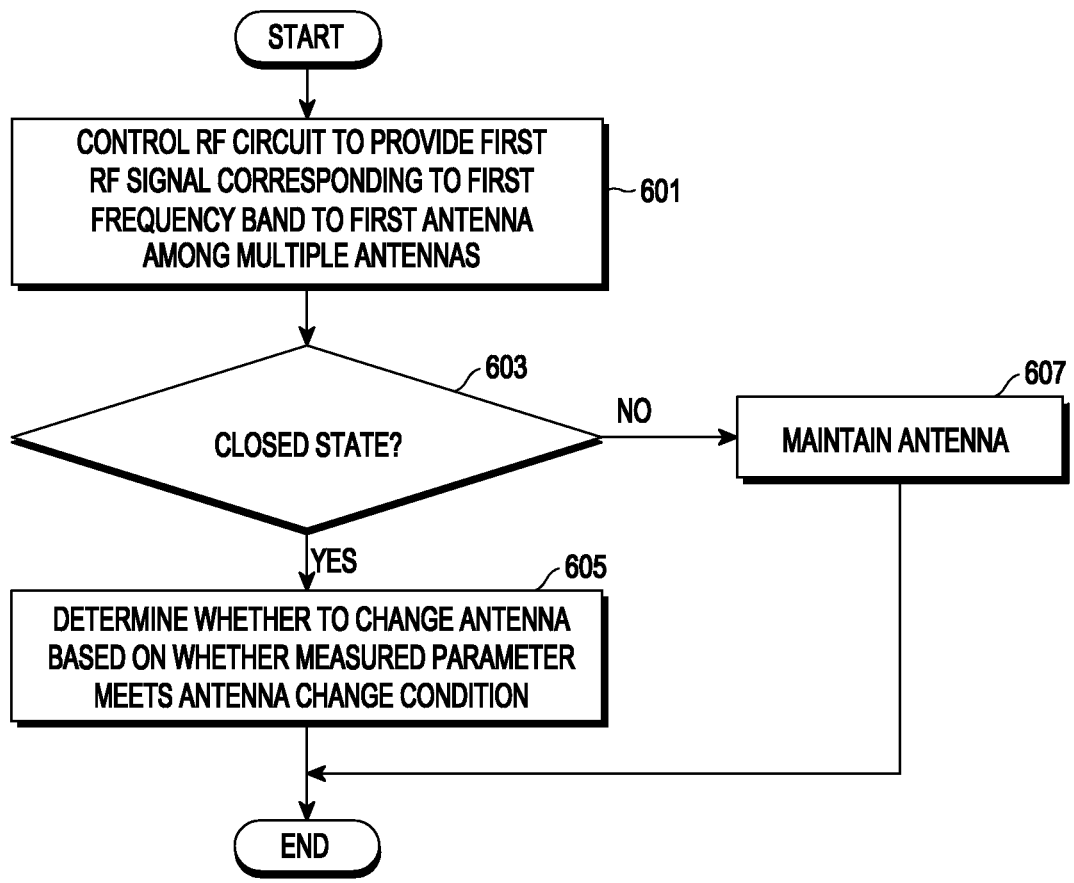
FIG. 6 is a flowchart illustrating an example method of operating an electronic device according to various embodiments.

FIG. 6 is a flowchart illustrating an example method of operating an electronic device according to various embodiments.

According to an embodiment, the electronic device 101 (e.g., the first communication processor 212 of FIG. 2A, the second communication processor 214 of FIG. 2A, and/or the integrated communication processor 260 of FIG. 2B) may control the RF circuitry (e.g., the RF circuitry 300 of FIG. 3A or the RF circuitry 310 of FIG. 3B) to provide a first RF signal corresponding to a first frequency band to a first antenna among a plurality of antennas in operation 601. Here, the first antenna may be, e.g., a transmission antenna corresponding to the open state, but is not limited thereto. In operation 603, the electronic device 101 may identify whether the folding state of the electronic device 101 is the closed state. Upon identifying that the folding state is the closed state (yes in 603), the electronic device 101 may determine whether to change the antenna based on whether the measured parameter meets the antenna change condition in operation 605. For example, operation 605 may be a transmission antenna change algorithm on state. In the embodiment of FIG. 6, the electronic device 101 may perform an antenna change when the measured parameter (e.g., the received strength for each antenna, but is not limited) meets the antenna change condition without performing an antenna change immediately as the folding state of the electronic device 101 is identified as the closed state. The electronic device 101 may maintain the antenna when the measured parameter (e.g., the received strength for each antenna, but is not limited) does not meet the antenna change condition although the folding state is the closed state. Upon identifying that the folding state is not the closed state (no in 603), the electronic device 101 may maintain the antenna in operation 607. Meanwhile, according to an embodiment, when the folding state is identified as the closed state, and a grip on the electronic device 101 is identified, the electronic device 101 may be configured to determine whether to change the antenna based on whether the measured parameter meets the antenna change condition in operation 605. For example, operation 607 may be a transmission antenna change algorithm off state.

Figure 7A:
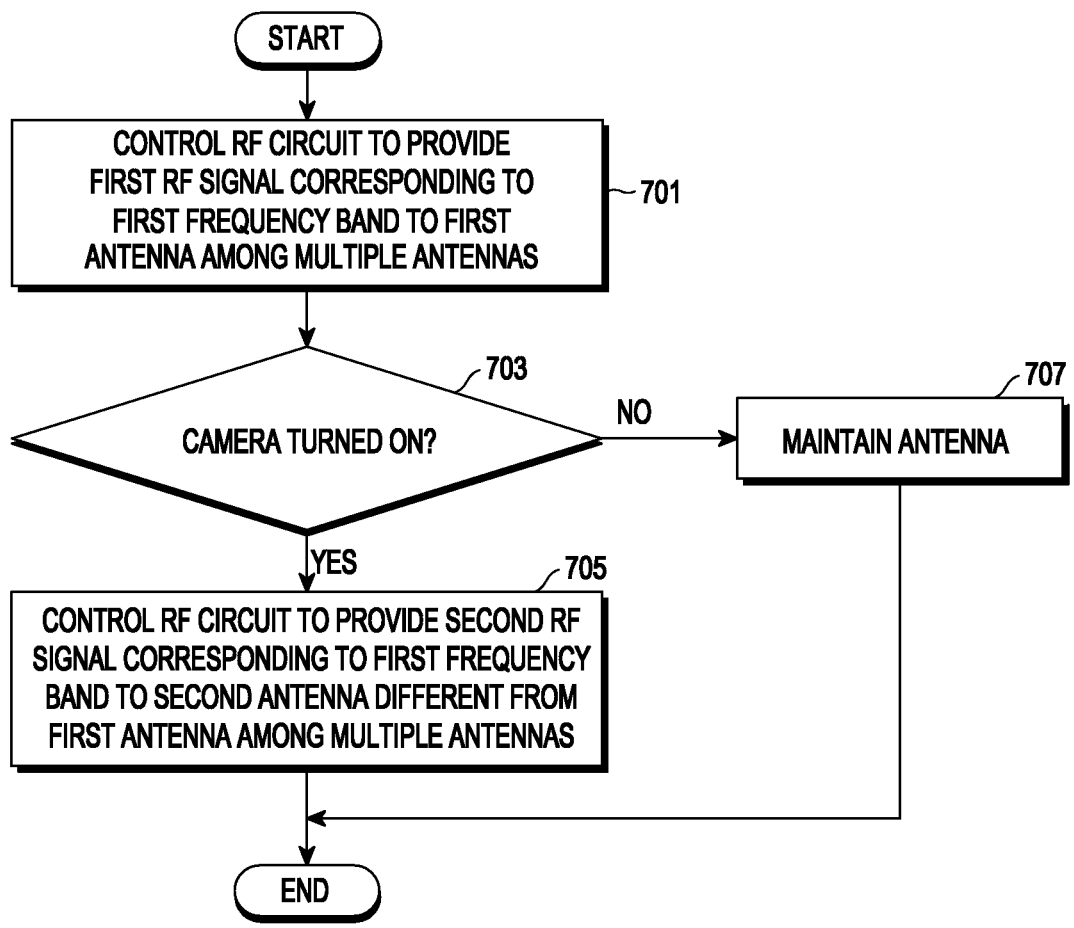
FIG. 7A is a flowchart illustrating an example method of operating an electronic device according to various embodiments.
Figure 7B:
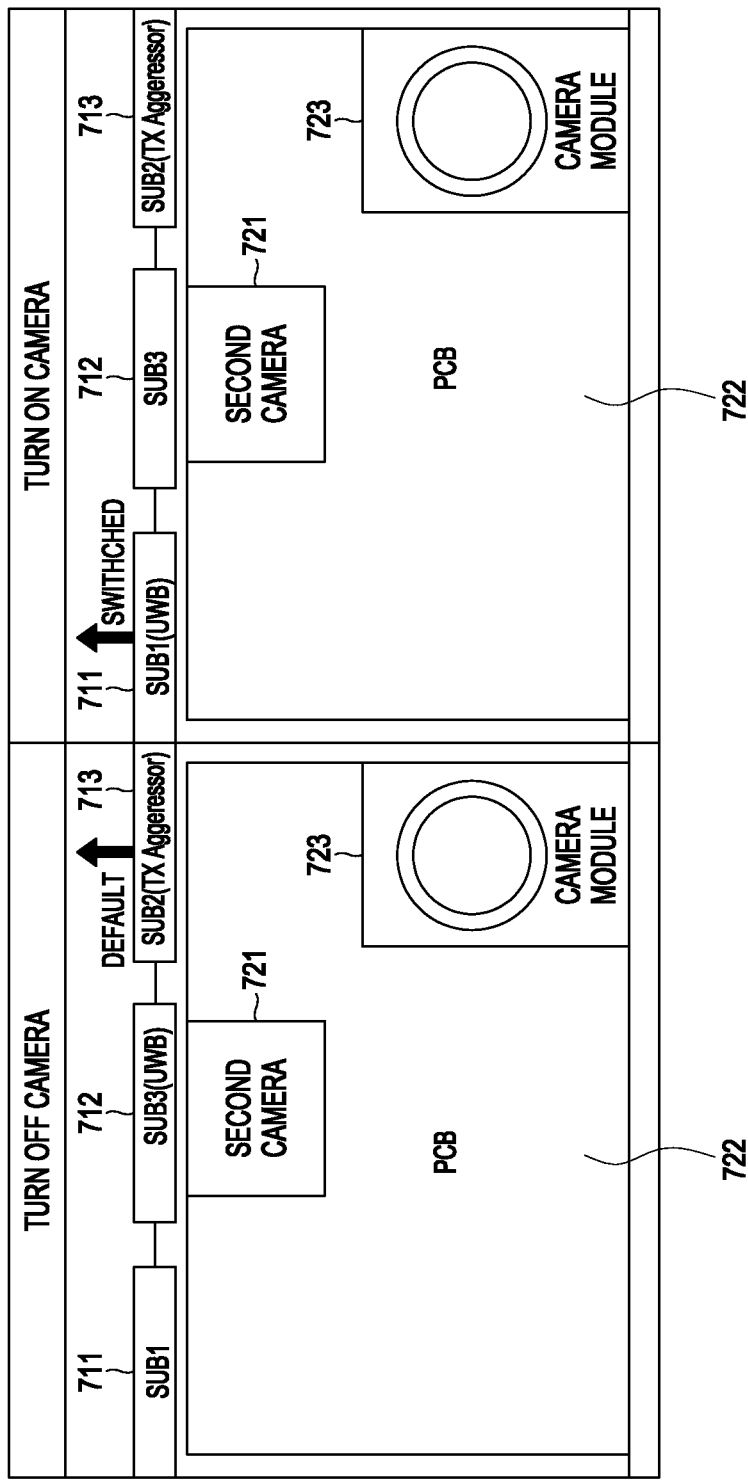
FIG. 7B is a diagram illustrating an arrangement of an antenna and a camera according to various embodiments.

FIG. 7A is a flowchart illustrating an example method of operating an electronic device according to various embodiments. The embodiment of FIG. 7A is described with reference to FIG. 7B. FIG. 7B is a diagram illustrating an arrangement of an antenna and a camera according to various embodiments.

Referring to FIG. 7A, according to an embodiment, the electronic device 101 (e.g., the first communication processor 212 of FIG. 2A, the second communication processor 214 of FIG. 2A, and/or the integrated communication processor 260 of FIG. 2B) may control the RF circuitry (e.g., the RF circuitry 300 of FIG. 3A or the RF circuitry 310 of FIG. 3B) to provide a first RF signal corresponding to a first frequency band to a first antenna among a plurality of antennas in operation 701. In operation 701, the first antenna may be, e.g., a transmission antenna configured corresponding to the first frequency band while the camera is turned off. For example, referring to FIG. 7B, a first camera 723 and a second camera 721 may be disposed on the PCB 722 of the electronic device 101. For example, the second camera 721 may be a front camera, and the first camera 723 may be a rear camera, but is not limited thereto. The electronic device 101 may include the first antenna 713, the second antenna 711, and a third antenna 712. For example, the first antenna 713 may be, e.g., a basic (or default) transmission antenna corresponding to the first frequency band. Accordingly, while the first camera 723 is turned off, the electronic device 101 may control the RF circuitry to provide the RF signal of the first frequency band to the first antenna 713.

Referring back to FIG. 7A, according to an embodiment, in operation 703, the electronic device 101 may identify whether the camera is turned on. When the camera is turned on (yes in 703), the electronic device 101 may control the RF circuitry to provide the second RF signal corresponding to the first frequency band to the second antenna different from the first antenna among the plurality of antennas in operation 705. When the camera is not turned on (no in 703), the electronic device 101 may maintain the antenna in operation 707. For example, referring to FIG. 7B, the electronic device 101 may control the RF circuitry to provide the second RF signal to the second antenna 711 different from the first antenna 713. In FIG. 7B, the distance between the first antenna 713 and the first camera 723 may be relatively small. As the RF signal is provided from the first antenna 713, electromagnetic waves generated from the first antenna 713 may affect the first camera 723. If the use of the first antenna 713 is maintained while the first camera 723 is turned on, the quality of the image obtained by the first camera 723 may deteriorate. To maintain image quality, the transmission power of the RF signal should be reduced (e.g., reduce by 7 dB), but this may deteriorate communication quality. Accordingly, in a state in which the first camera 723 is turned on, the electronic device 101 may change the transmission antenna from the first antenna 713, which is the basic transmission antenna, to the second antenna 711. The electronic device 101 may control the RF circuitry so that the second RF signal of the first frequency band is provided to the second antenna 711. Since the distance between the second antenna 711 and the first camera 723 is relatively large, the influence of electromagnetic waves generated from the second antenna 711 on the first camera 723 may be relatively small. Accordingly, the electronic device 101 may not reduce, or may reduce by a relatively small degree, the transmission power of the RF signal provided to the second antenna 711, thereby preventing (or mitigating) communication quality degradation and/or degradation of quality of the image obtained by the first camera 723.

According to an embodiment, the electronic device 101 may change the transmission antenna from the first antenna 713 to the third antenna 712 based on the turn-on of the first camera 723. Meanwhile, the second camera 721 may be turned on while performing communication based on the third antenna 712. The distance between the third antenna 712 and the second camera 721 may be relatively small, and electromagnetic waves generated from the third antenna 712 may affect the second camera 721. The electronic device 101 may change the transmission antenna based on the turn-on of the second camera 721. For example, when the first camera 723 is turned off while the second camera 721 is turned on, the electronic device 101 may change the transmission antenna to the first antenna 713 which is the basic transmission antenna. For example, when both the cameras 721 and 723 are turned on, the electronic device 101 may determine that the second antenna 711 having the least influence on both the cameras 721 and 722) (or having the largest spacing) is the transmission antenna.

Figure 7C:
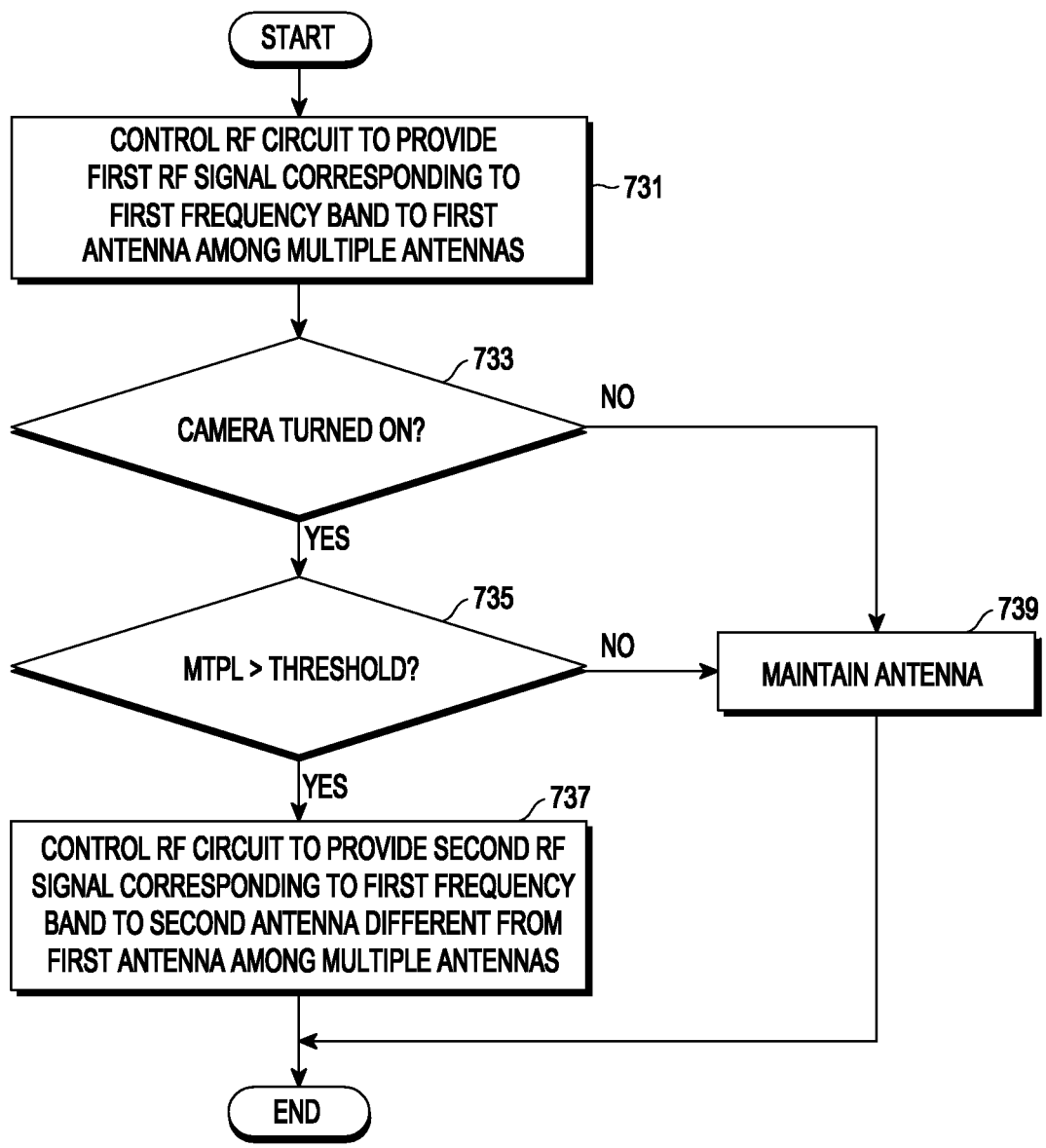
FIG. 7C is a flowchart illustrating an example method of operating an electronic device according to various embodiments.

FIG. 7C is a flowchart illustrating an example method of operating an electronic device according to various embodiments.

According to an embodiment, the electronic device 101 (e.g., the first communication processor 212 of FIG. 2A, the second communication processor 214 of FIG. 2A, and/or the integrated communication processor 260 of FIG. 2B) may control the RF circuitry (e.g., the RF circuitry 300 of FIG. 3A or the RF circuitry 310 of FIG. 3B) to provide a first RF signal corresponding to a first frequency band to a first antenna among a plurality of antennas in operation 731. In operation 731, the first antenna may be, e.g., a transmission antenna configured corresponding to the first frequency band while the camera is turned off. In operation 733, the electronic device 101 may identify whether the camera is turned on. When the camera is not turned on (no in 733), the electronic device 101 may maintain the antenna in operation 739. When the camera is turned on (yes in 733), the electronic device 101 may identify whether the MTPL for the second RF signal exceeds a threshold in operation 735. When the MTPL exceeds the threshold (yes in 735), the electronic device 101 may control the RF circuitry to provide the second RF signal corresponding to the first frequency band to the second antenna different from the first antenna among the plurality of antennas in operation 737. When the MTPL is the threshold or less (no in 735), the electronic device 101 may maintain the antenna in operation 739. For example, since the distance between the first antenna 713 and the first camera 723 is relatively small in FIG. 7B, the electromagnetic waves generated from the first antenna 713 may affect the first camera 723. Meanwhile, when the transmission power of the RF signal applied to the first antenna 713 is relatively small, the influence of the electromagnetic waves generated from the first antenna 713 on the first camera 723 may be reduced as well. Accordingly, when electromagnetic waves with a relatively small magnitude are generated, it may be preferable to maintain use of the basic transmission antenna rather than performing an antenna change. Accordingly, as shown in FIG. 7C, the electronic device 101 may be configured to perform a transmission antenna change when the MTPL exceeds the threshold and maintain the transmission antenna when the MTPL is the threshold or less. The threshold (e.g., 16 dBm) may be determined to be a value at which a relatively good quality of image may be measured by the camera, but is not limited. For example, when 5G SA is used, 3 dB transmission power back-off relative to the average transmission power may be performed and, when EN-DC is used, 10 dB transmission power back-off relative to the average transmission power may be performed. Thus a context where the MTPL is the threshold (e.g., 16 dBm) or less may occur and, in this case, the transmission antenna may be maintained.

Figure 7D:
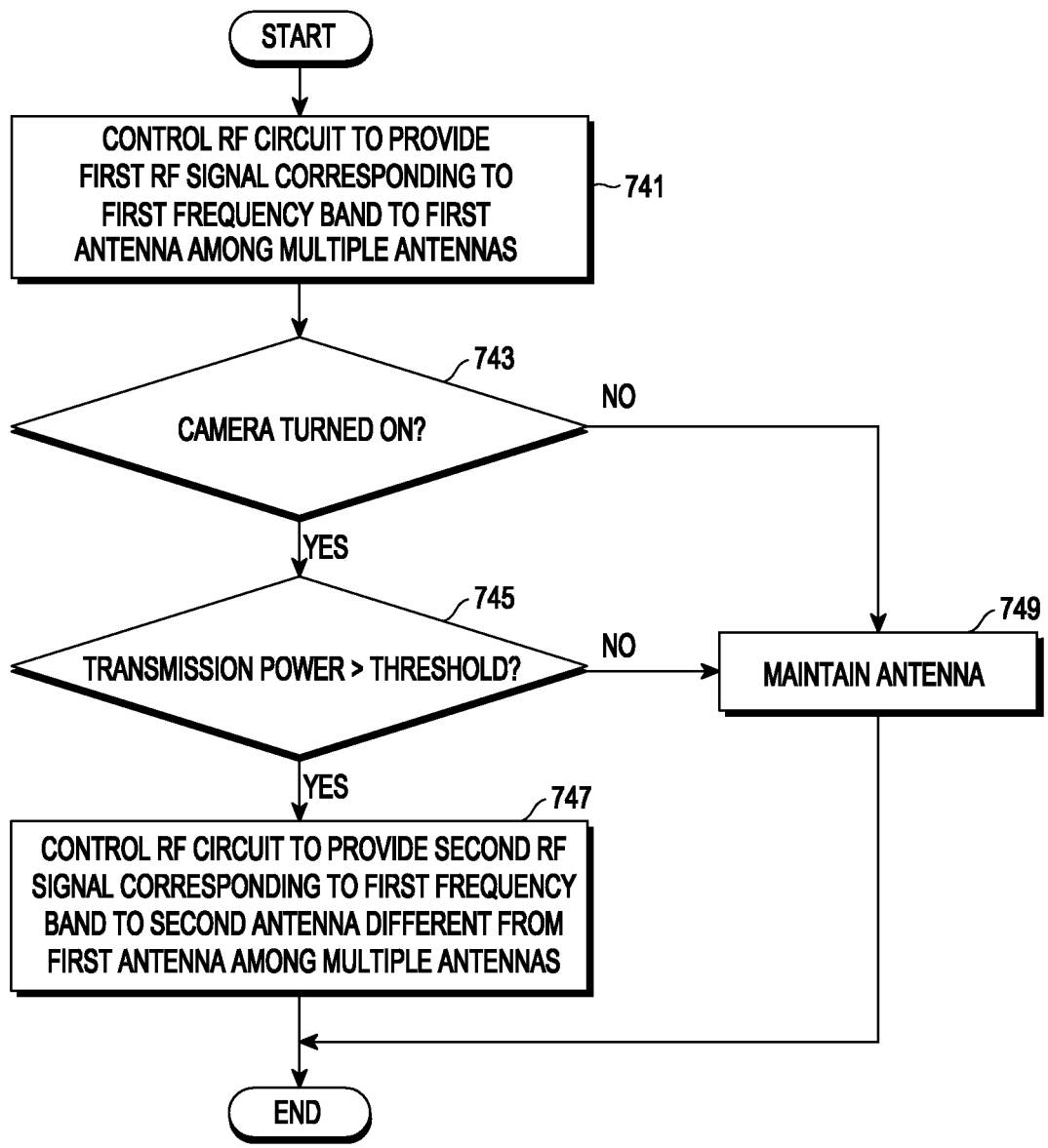
FIG. 7D is a flowchart illustrating an example method of operating an electronic device according to various embodiments.

FIG. 7D is a flowchart illustrating an example method of operating an electronic device according to various embodiments.

According to an embodiment, the electronic device 101 (e.g., the first communication processor 212 of FIG. 2A, the second communication processor 214 of FIG. 2A, and/or the integrated communication processor 260 of FIG. 2B) may control the RF circuitry (e.g., the RF circuitry 300 of FIG. 3A or the RF circuitry 310 of FIG. 3B) to provide a first RF signal corresponding to a first frequency band to a first antenna among a plurality of antennas in operation 741. In operation 741, the first antenna may be, e.g., a transmission antenna configured corresponding to the first frequency band while the camera is turned off. In operation 743, the electronic device 101 may identify whether the camera is turned on. When the camera is not turned on (no in 743), the electronic device 101 may maintain the antenna in operation 749. When the camera is turned on (yes in 743), the electronic device 101 may identify whether the transmission power for the second RF signal exceeds a threshold in operation 745. When the transmission power exceeds the threshold (yes in 745), the electronic device 101 may control the RF circuitry to provide the second RF signal corresponding to the first frequency band to the second antenna different from the first antenna among the plurality of antennas in operation 747. When the transmission power is the threshold or less (no in 745), the electronic device 101 may maintain the antenna in operation 749. As described in connection with FIG. 7C, when electromagnetic waves with a relatively small magnitude are generated, it may be preferable to maintain use of the basic transmission antenna rather than performing an antenna change. Accordingly, as shown in FIG. 7D, the electronic device 101 may be configured to perform a transmission antenna change when the transmission power exceeds the threshold and maintain the transmission antenna when the transmission power is the threshold or less. The threshold may be determined to be a value at which a relatively good quality of image may be measured by the camera, but is not limited.

Figure 8:
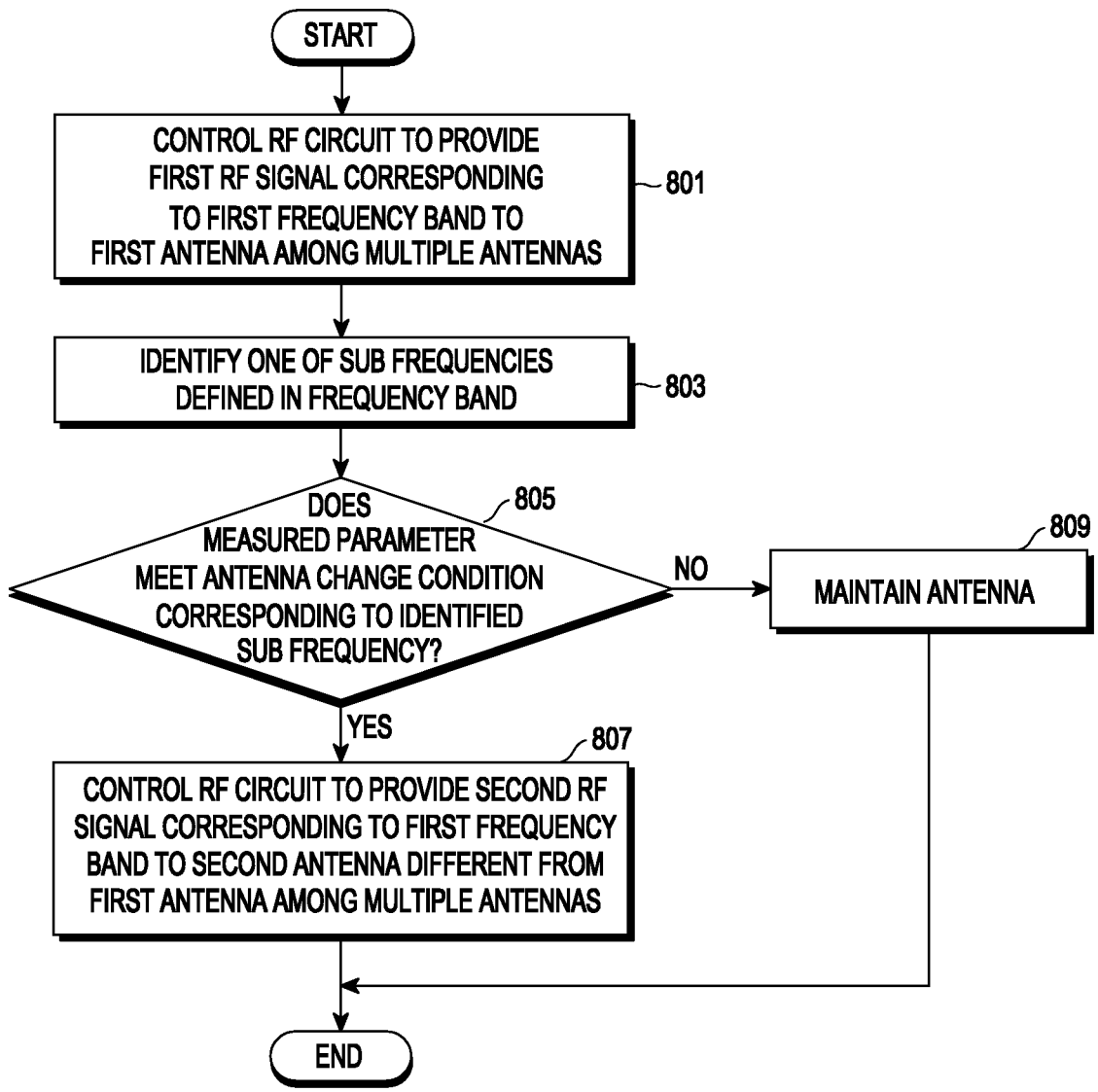
FIG. 8 is a flowchart illustrating an example method of operating an electronic device according to various embodiments.

FIG. 8 is a flowchart illustrating an example method of operating an electronic device according to various embodiments.

According to an embodiment, in operation 801, the electronic device 101 (e.g., the communication processor 212, 214, and/or 260) may control the RF circuitry (e.g., the RF circuitry 300 of FIG. 3A or the RF circuitry 310 of FIG. 3B) to provide a first RF signal corresponding to a first frequency band to a first antenna among the plurality of antennas. In operation 803, the electronic device 101 may identify one of the sub frequencies in the frequency band. In operation 805, the electronic device 101 may identify whether the measured parameter meets the antenna change condition corresponding to the identified sub frequency. Meanwhile, the electronic device 101 may be configured to identify the antenna change condition corresponding to the identified sub frequency, but is not limited. For example, the antenna change condition may be set to differ for each sub frequency. For example, the high threshold and/or low threshold may be set to differ for each sub frequency. For example, the imbalance between antennas (e.g., PPx antenna and DRx antenna) may be set to differ for each sub frequency. For example, Table 1 is an example of the threshold (e.g., high threshold) for each sub frequency in the N78 band.

TABLE 1

| | Sub frequency | | |
|---|---|---|---|
| | Low (3750 Mhz) | Mid (3840 Mhz) | High (3930 Mhz) |
| Threshold (high threshold) | Threshold 1 | Threshold 2 | Threshold 3 |

As described above, the electronic device 101 may perform a transmission antenna change when the sum of the received strength difference (RSRP diff current) at the current time and the MTPL diff is the high threshold or more. Here, the high threshold may be set to differ for each for the low band (3750 MHz), mid band (3840 MHz), and high band (3903 MHz) of the N78 band, for example. The electronic device 101 may identify whether the antenna change condition set for each sub band is met in the N78 band. When the antenna change condition is met (yes in 805), the electronic device 101 may control the RF circuitry to provide the second RF signal corresponding to the first frequency band to the second antenna different from the first antenna among the plurality of antennas in operation 807. When the antenna change condition is met (no in 805), the electronic device 101 may maintain the antenna in operation 809. For example, it is assumed that the electronic device 101 uses the mid band in the N78 band. The sum of the received strength difference (RSRP diff current) and MTPL diff measured by the electronic device 101 may be larger than or equal to Threshold 1, but may be less than Threshold 2. Although the antenna change condition corresponding to the low band is met, the antenna change condition corresponding to the mid band is not met, so that the electronic device 101 may maintain the transmission antenna.

For example, Table 2 is an example of the threshold (e.g., high threshold) for each sub frequency in the N78 band.

TABLE 2

| | Sub frequency | | | | |
|---|---|---|---|---|---|
| | 3750 Mhz | 3800 Mhz | 3840 Mhz | 3880 Mhz | 3930 Mhz |
| Threshold (high threshold) | Threshold 1 | Threshold 2 | Threshold 3 | Threshold 4 | Threshold 5 |

While different thresholds are set for three sub frequencies for the N78 band in Table 1, different thresholds may be set for five sub frequencies for the N78 band in Table 2, but the number of divisions is not limited. Since the N78 band is relatively wide, sub thresholds as in Table 2 may be set. As described above, as the RSRP diff of the RSRP where the performance is not good at a specific sub frequency is relatively large, the transmission antenna may not be changed, or the case where a transmission antenna change is not performed although needed at a specific sub frequency may be prevented and/or reduced. For example, when the total radiated power (TRP) worsens, it may refer, for example, to the Rx performance in the TDD band worsening as well. Accordingly, in a case where a specific antenna is used for the N78 band, when the RSRP is PRx −91 dBm, and Drx −90 dBm, the RSRP Diff may increase to PRx −93.4 dBm, DRx −90 dBm even in the context of the same electric field. If the high threshold is 5 dB, and imbalance setting is 3750 MHz reference 1 dB, then RSRP Diff+MTPL Diff is 6 dB as a result. Thus, a transmission antenna change may be performed to 5 dB, which is the high threshold, or more. If the imbalance is 1 dB, PRx becomes −91 dBm when the DRx electric field is −90 dBm, and if the PRx electric field deteriorates by 5 dB when the MTPL is the same, a transmission antenna change may be performed. However, in a case where the imbalance is likewise set to 1 dB for 3930 MHz, when the DRx electric field is −90 dBm, the PRx is −93.4 dBm, so that a transmission antenna change may be performed even when the PRx electric field deteriorates by only 2.6 dB. As described above, to prevent and/or reduce a transmission antenna change from being performed according to a relatively small level of degradation of 2.6 dB, for 3930 Mhz, the high threshold and/or imbalance may be set to differ. For example, when the imbalance is set to 3.4 dB, transmission antenna change may not be performed until it deteriorates to 6 dB. Meanwhile, if the imbalance is set to 3.4 dB for the entire N78 band, transmission antenna change may be performed only when degradation occurs to 7.4 dB at 3750 MHz. Accordingly, even in one band, the threshold and/or imbalance of the antenna change condition may be set to differ for each sub frequency.

According to an example embodiment, an electronic device may comprise at least one communication processor (e.g., 212 or 214 of FIG. 2A or 260 of FIG. 2B), an RF circuitry (e.g., 300 of FIG. 3A or 310 of FIG. 3B) connected to the at least one communication processor (e.g., 212 or 214 of FIG. 2A or 260 of FIG. 2B), and a plurality of antennas (e.g., 305 and 315 of FIG. 3A or 325 and 327 of FIG. 3B) connected to the RF circuitry (e.g., 300 of FIG. 3A or 310 of FIG. 3B). The at least one communication processor (e.g., 212 or 214 of FIG. 2A or 260 of FIG. 2B) may be configured to control the RF circuitry (e.g., 300 of FIG. 3A or 310 of FIG. 3B) to provide a first RF signal corresponding to a first frequency band to a first antenna among the plurality of antennas (e.g., 305 and 315 of FIG. 3A or 325 and 327 of FIG. 3B) based on identifying that a folding state of the electronic device is an open state. The at least one communication processor (e.g., 212 or 214 of FIG. 2A or 260 of FIG. 2B) may be configured to, based on identifying the folding state of the electronic device being a closed state, identify whether the electronic device is gripped. The at least one communication processor (e.g., 212 or 214 of FIG. 2A or 260 of FIG. 2B) may be configured to control the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the electronic device is gripped.

According to an example embodiment, the at least one communication processor (e.g., 212 or 214 of FIG. 2A or 260 of FIG. 2B) may be configured, as at least part of controlling the RF circuitry (e.g., 300 of FIG. 3A or 310 of FIG. 3B) to provide the second RF signal to the second antenna based on identifying that the electronic device is gripped, control the RF circuitry (e.g., 300 of FIG. 3A or 310 of FIG. 3B) to provide the second RF signal to the second antenna, based on identifying that the electronic device is gripped, independently from at least one first parameter associated with the first antenna and at least one second parameter associated with the second antenna.

According to an example embodiment, the at least one communication processor (e.g., 212 or 214 of FIG. 2A or 260 of FIG. 2B) may be configured to, as at least part of controlling the RF circuitry (e.g., 300 of FIG. 3A or 310 of FIG. 3B) provide the second RF signal to the second antenna based on identifying that the electronic device is gripped, control the RF circuitry (e.g., 300 of FIG. 3A or 310 of FIG. 3B) to provide the second RF signal to the second antenna, based on at least one first parameter associated with the first antenna and at least one second parameter associated with the second antenna meeting an antenna change condition.

According to an example embodiment, the at least one communication processor (e.g., 212 or 214 of FIG. 2A or 260 of FIG. 2B) may be further configured to, based on identifying that the electronic device is not gripped, identify whether at least one first parameter associated with the first antenna and at least one second parameter associated with the second antenna meets an antenna change condition. The at least one communication processor (e.g., 212 or 214 of FIG. 2A or 260 of FIG. 2B) may be further configured to control the RF circuitry (e.g., 300 of FIG. 3A or 310 of FIG. 3B) to provide a third RF signal corresponding to the first frequency band to the second antenna, based on the at least one first parameter and the at least one second parameter meeting the antenna change condition.

According to an example embodiment, the at least one communication processor (e.g., 212 or 214 of FIG. 2A or 260 of FIG. 2B) may be further configured to control the RF circuitry (e.g., 300 of FIG. 3A or 310 of FIG. 3B) to provide the third RF signal to the first antenna, based on the at least one first parameter and the at least one second parameter not meeting the antenna change condition.

According to an example embodiment, the at least one communication processor (e.g., 212 or 214 of FIG. 2A or 260 of FIG. 2B) may be further configured to control the RF circuitry (e.g., 300 of FIG. 3A or 310 of FIG. 3B) to provide the third RF signal corresponding to the first frequency band to the first antenna, based on identifying that the electronic device is not gripped.

According to an example embodiment, in the folding state of the closed state, a first distance to a third antenna most adjacent from the first antenna may be less than a second distance to a fourth antenna most adjacent from the second antenna.

According to an example embodiment, the at least one communication processor (e.g., 212 or 214 of FIG. 2A or 260 of FIG. 2B) may be further configured to control the RF circuitry (e.g., 300 of FIG. 3A or 310 of FIG. 3B) to provide a fourth RF signal corresponding to the first frequency band to the first antenna among the plurality of antennas (e.g., 305 and 315 of FIG. 3A or 325 and 327 of FIG. 3B), based on the folding state being the open state.

According to an example embodiment, a method of operating an electronic device including an RF circuitry (e.g., 300 of FIG. 3A or 310 of FIG. 3B) and a plurality of antennas (e.g., 305 and 315 of FIG. 3A or 325 and 327 of FIG. 3B) connected to the RF circuitry (e.g., 300 of FIG. 3A or 310 of FIG. 3B) may comprise controlling the RF circuitry (e.g., 300 of FIG. 3A or 310 of FIG. 3B) to provide a first RF signal corresponding to a first frequency band to a first antenna among the plurality of antennas (e.g., 305 and 315 of FIG. 3A or 325 and 327 of FIG. 3B) based on identifying that a folding state of the electronic device is an open state. The method of operating the electronic device may comprise, based on identifying the folding state of the electronic device being a closed state, identifying whether the electronic device is gripped. The method of operating the electronic device may comprise controlling the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the electronic device is gripped.

According to an example embodiment, a non-transitory computer-readable storage medium may store instructions that, when executed by at least one processor, cause an electronic device to perform at least one operation. The at least one operation may comprise controlling the RF circuitry (e.g., 300 of FIG. 3A or 310 of FIG. 3B) of the electronic device to provide a first RF signal corresponding to a first frequency band to a first antenna among the plurality of antennas (e.g., 305 and 315 of FIG. 3A or 325 and 327 of FIG. 3B) based on identifying that a folding state of the electronic device is an open state. The at least one operation may comprise, based on identifying the folding state of the electronic device being a closed state, identifying whether the electronic device is gripped. The at least one operation may comprise controlling the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the electronic device is gripped.

According to an example embodiment, an electronic device may comprise: at least one communication processor (e.g., 212 or 214 of FIG. 2A or 260 of FIG. 2B), a camera, an RF circuitry (e.g., 300 of FIG. 3A or 310 of FIG. 3B) connected to the at least one communication processor (e.g., 212 or 214 of FIG. 2A or 260 of FIG. 2B), and a plurality of antennas (e.g., 305 and 315 of FIG. 3A or 325 and 327 of FIG. 3B) connected to the RF circuitry (e.g., 300 of FIG. 3A or 310 of FIG. 3B). The at least one communication processor (e.g., 212 or 214 of FIG. 2A or 260 of FIG. 2B) may be configured to control the RF circuitry (e.g., 300 of FIG. 3A or 310 of FIG. 3B) to provide a first RF signal corresponding to a first frequency band to a first antenna among the plurality of antennas (e.g., 305 and 315 of FIG. 3A or 325 and 327 of FIG. 3B), based on identifying that the camera is in an off state. The at least one communication processor (e.g., 212 or 214 of FIG. 2A or 260 of FIG. 2B) may be configured to control the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the camera is changed from the off state to an on state.

According to an example embodiment, controlling the RF circuitry (e.g., 300 of FIG. 3A or 310 of FIG. 3B) to provide the second RF signal to the second antenna based on identifying that the electronic device is gripped may control the RF circuitry (e.g., 300 of FIG. 3A or 310 of FIG. 3B) to provide the second RF signal to the second antenna based on identifying that the electronic device is gripped, independently from at least one first parameter associated with the first antenna and at least one second parameter associated with the second antenna.

According to an example embodiment, controlling the RF circuitry (e.g., 300 of FIG. 3A or 310 of FIG. 3B) to provide the second RF signal to the second antenna, based on identifying that the electronic device is gripped may control the RF circuitry (e.g., 300 of FIG. 3A or 310 of FIG. 3B) to provide the second RF signal to the second antenna, based on at least one first parameter associated with the first antenna and at least one second parameter associated with the second antenna meeting an antenna change condition.

According to an example embodiment, the method of operating the electronic device may further comprise, based on identifying that the electronic device is not gripped, identifying whether at least one first parameter associated with the first antenna and at least one second parameter associated with the second antenna meets an antenna change condition. The method of operating the electronic device may further comprise controlling the RF circuitry (e.g., 300 of FIG. 3A or 310 of FIG. 3B) to provide a third RF signal corresponding to the first frequency band to the second antenna, based on the at least one first parameter and the at least one second parameter meeting the antenna change condition.

According to an example embodiment, the method of operating the electronic device may further comprise controlling the RF circuitry (e.g., 300 of FIG. 3A or 310 of FIG. 3B) to provide the third RF signal to the first antenna, based on the at least one first parameter and the at least one second parameter not meeting the antenna change condition.

According to an example embodiment, the method of operating the electronic device may further comprise controlling the RF circuitry (e.g., 300 of FIG. 3A or 310 of FIG. 3B) to provide the third RF signal corresponding to the first frequency band to the first antenna, based on identifying that the electronic device is not gripped.

According to an example embodiment, in the folding state of the closed state, a first distance to a third antenna most adjacent from the first antenna may be less than a second distance to a fourth antenna most adjacent from the second antenna.

According to an example embodiment, the method of operating the electronic device may further comprise controlling the RF circuitry (e.g., 300 of FIG. 3A or 310 of FIG. 3B) to provide a fourth RF signal corresponding to the first frequency band to the first antenna among the plurality of antennas (e.g., 305 and 315 of FIG. 3A or 325 and 327 of FIG. 3B), based on the folding state being the open state.

According to an example embodiment, a method of operating an electronic device including a camera, an RF circuitry (e.g., 300 of FIG. 3A or 310 of FIG. 3B), and a plurality of antennas (e.g., 305 and 315 of FIG. 3A or 325 and 327 of FIG. 3B) connected to the RF circuitry (e.g., 300 of FIG. 3A or 310 of FIG. 3B) may comprise controlling the RF circuitry (e.g., 300 of FIG. 3A or 310 of FIG. 3B) to provide a first RF signal corresponding to a first frequency band to a first antenna among the plurality of antennas (e.g., 305 and 315 of FIG. 3A or 325 and 327 of FIG. 3B), based on identifying that the camera is in an off state. The method of operating the electronic device may comprise controlling the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the camera is changed from the off state to an on state.

According to an example embodiment, a non-transitory computer-readable storage medium may store instructions that, when executed by at least one processor, cause an electronic device to perform at least one operation. The at least one operation may comprise controlling the RF circuitry (e.g., 300 of FIG. 3A or 310 of FIG. 3B) to provide a first RF signal corresponding to a first frequency band to a first antenna among the plurality of antennas (e.g., 305 and 315 of FIG. 3A or 325 and 327 of FIG. 3B) of the electronic device, based on identifying that the camera of the electronic device is in an off state. The at least one operation may comprise controlling the RF circuitry (e.g., 300 of FIG. 3A or 310 of FIG. 3B) to provide a second RF signal corresponding to the first frequency band to a second antenna different from the first antenna among the plurality of antennas (e.g., 305 and 315 of FIG. 3A or 325 and 327 of FIG. 3B), based on identifying that the camera is changed from the off state to an on state.

According to an example embodiment, a first distance between the first antenna and the camera may be less than a second distance between the second antenna and the camera.

According to an example embodiment, the at least one communication processor (e.g., 212 or 214 of FIG. 2A or 260 of FIG. 2B) may be configured to, as at least part of controlling the RF circuitry (300 of FIG. 3A or 310 of FIG. 3B) provide the second RF signal to the second antenna based on identifying that the camera is changed from the off state to the on state, control the RF circuitry (e.g., 300 of FIG. 3A or 310 of FIG. 3B) to provide the second RF signal to the second antenna, based on identifying that a maximum transmission power level (MTPL) corresponding to the second antenna is a threshold or less.

According to an example embodiment, an electronic device may comprise at least one communication processor (e.g., 212 or 214 of FIG. 2A or 260 of FIG. 2B), an RF circuitry (300 of FIG. 3A or 310 of FIG. 3B) connected to the at least one communication processor (e.g., 212 or 214 of FIG. 2A or 260 of FIG. 2B), and a plurality of antennas (e.g., 305 and 315 of FIG. 3A or 325 and 327 of FIG. 3B) connected to the RF circuitry (e.g., 300 of FIG. 3A or 310 of FIG. 3B). The at least one communication processor (e.g., 212 or 214 of FIG. 2A or 260 of FIG. 2B) may be configured to control the RF circuitry (e.g., 300 of FIG. 3A or 310 of FIG. 3B) to provide a first RF signal corresponding to a first sub frequency of a first frequency band to a first antenna among the plurality of antennas (e.g., 305 and 315 of FIG. 3A or 325 and 327 of FIG. 3B). The at least one communication processor (e.g., 212 or 214 of FIG. 2A or 260 of FIG. 2B) may be configured to identify whether at least one first parameter associated with the first antenna and at least one second parameter associated with the second antenna meet an antenna change condition, wherein the condition may be set corresponding to the first sub frequency of the first frequency band. The at least one communication processor (e.g., 212 or 214 of FIG. 2A or 260 of FIG. 2B) may be configured to control the RF circuitry (e.g., 300 of FIG. 3A or 310 of FIG. 3B) to provide a second RF signal corresponding to the first sub frequency of the first frequency band to a second antenna different from the first antenna among the plurality of antennas (e.g., 305 and 315 of FIG. 3A or 325 and 327 of FIG. 3B), based on the at least one first parameter and the at least one second parameter meeting the antenna change condition.

According to an example embodiment, a method of operating an electronic device including an RF circuitry (e.g., 300 of FIG. 3A or 310 of FIG. 3B) and a plurality of antennas (e.g., 305 and 315 of FIG. 3A or 325 and 327 of FIG. 3B) connected to the RF circuitry (e.g., 300 of FIG. 3A or 310 of FIG. 3B) may comprise controlling the RF circuitry (e.g., 300 of FIG. 3A or 310 of FIG. 3B) to provide a first RF signal corresponding to a first sub frequency of a first frequency band to a first antenna among the plurality of antennas (e.g., 305 and 315 of FIG. 3A or 325 and 327 of FIG. 3B). The method of operating the electronic device may include identifying whether at least one first parameter associated with the first antenna and at least one second parameter associated with the second antenna meet an antenna change condition, wherein the condition may be set corresponding to the first sub frequency of the first frequency band. The method of operating the electronic device may comprise controlling the RF circuitry (e.g., 300 of FIG. 3A or 310 of FIG. 3B) to provide a second RF signal corresponding to the first sub frequency of the first frequency band to a second antenna different from the first antenna among the plurality of antennas (e.g., 305 and 315 of FIG. 3A or 325 and 327 of FIG. 3B), based on the at least one first parameter and the at least one second parameter meeting the condition.

According to an example embodiment, a non-transitory computer-readable storage medium may store instructions that, when executed by at least one processor, cause an electronic device to perform at least one operation. The at least one operation may comprise controlling the RF circuitry (e.g., 300 of FIG. 3A or 310 of FIG. 3B) of the electronic device to provide a first RF signal corresponding to a first sub frequency of a first frequency band to a first antenna among the plurality of antennas (e.g., 305 and 315 of FIG. 3A or 325 and 327 of FIG. 3B). The at least one operation may comprise identifying whether at least one first parameter associated with the first antenna and at least one second parameter associated with the second antenna meet an antenna change condition, wherein the condition may be set corresponding to the first sub frequency of the first frequency band. The at least one operation may comprise controlling the RF circuitry (e.g., 300 of FIG. 3A or 310 of FIG. 3B) to provide a second RF signal corresponding to the first sub frequency of the first frequency band to a second antenna different from the first antenna among the plurality of antennas (e.g., 305 and 315 of FIG. 3A or 325 and 327 of FIG. 3B), based on the at least one first parameter and the at least one second parameter meeting the condition.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one communication processor including processing circuitry;
an RF circuitry connected to the at least one communication processor; and
a plurality of antennas connected to the RF circuitry,
memory storing instructions, wherein the instructions, when executed by the at least one communication processor individually and/or collectively, cause the electronic device to:
based on identifying a folding state of the electronic device being an open state: control the RF circuitry to provide a first RF signal corresponding to a first frequency band to a first antenna among the plurality of antennas, and
based on identifying the folding state of the electronic device being a closed state and the electronic device is gripped, control the RF circuitry to provide a second RF signal corresponding to the first frequency band to a second antenna different from the first antenna among the plurality of antennas.

2. The electronic device of claim 1, wherein the instructions, when executed by the at least one communication processor individually and/or collectively, cause the electronic device to, as at least part of controlling, based on identifying that the electronic device is gripped, the RF circuitry to provide the second RF signal to the second antenna:
control, based on identifying that the electronic device is gripped, the RF circuitry to provide the second RF signal to the second antenna independently from at least one first parameter associated with the first antenna and at least one second parameter associated with the second antenna.

3. The electronic device of claim 1, wherein the instructions, when executed by the at least one communication processor individually and/or collectively, cause the electronic device to, as at least part of controlling, based on identifying that the electronic device is gripped, the RF circuitry to provide the second RF signal to the second antenna:
control the RF circuitry to provide the second RF signal to the second antenna, based on at least one first parameter associated with the first antenna and at least one second parameter associated with the second antenna meeting an antenna change condition.

4. The electronic device of claim 1,
wherein the instructions, when executed by the at least one communication processor individually and/or collectively, cause the electronic device to, based on identifying that the electronic device is not gripped:
identify whether at least one first parameter associated with the first antenna and at least one second parameter associated with the second antenna meet an antenna change condition, and control the RF circuitry to provide a third RF signal corresponding to the first frequency band to the second antenna, based on the at least one first parameter and the at least one second parameter meeting the antenna change condition.

5. The electronic device of claim 4, wherein the instructions, when executed by the at least one communication processor individually and/or collectively, cause the electronic device to control the RF circuitry to provide the third RF signal to the first antenna, based on the at least one first parameter and the at least one second parameter not meeting the antenna change condition.

6. The electronic device of claim 1, wherein the instructions, when executed by the at least one communication processor individually and/or collectively, cause the electronic device to control the RF circuitry to provide the third RF signal corresponding to the first frequency band to the first antenna, based on identifying that the electronic device is not gripped.

7. The electronic device of claim 1, wherein based on the folding state being the closed state, a first distance to a third antenna most adjacent from the first antenna is less than a second distance to a fourth antenna most adjacent from the second antenna.

8. The electronic device of claim 1, wherein the instructions, when executed by the at least one communication processor individually and/or collectively, cause the electronic device to control the RF circuitry to provide a fourth RF signal corresponding to the first frequency band to the first antenna among the plurality of antennas, based on the folding state being the open state.

9. A method of operating an electronic device including an RF circuitry and a plurality of antennas connected to the RF circuitry, the method comprising:
controlling, based on identifying that a folding state of the electronic device is an open state, the RF circuitry to provide a first RF signal corresponding to a first frequency band to a first antenna among the plurality of antennas; and
based on identifying the folding state of the electronic device being a closed state and the electronic device is gripped, controlling the RF circuitry to provide a second RF signal corresponding to the first frequency band to a second antenna different from the first antenna among the plurality of antennas.

10. The method of claim 9, wherein the controlling, based on identifying that the electronic device is gripped, the RF circuitry to provide the second RF signal to the second antenna, comprises:
controlling, based on identifying that the electronic device is gripped, the RF circuitry to provide the second RF signal to the second antenna, independently from at least one first parameter associated with the first antenna and at least one second parameter associated with the second antenna.

11. The method of claim 9, wherein the controlling, based on identifying that the electronic device is gripped, the RF circuitry to provide the second RF signal to the second antenna, comprises:
controlling the RF circuitry to provide the second RF signal to the second antenna, based on at least one first parameter associated with the first antenna and at least one second parameter associated with the second antenna meeting an antenna change condition.

12. The method of claim 9, further comprising,
based on identifying that the electronic device is not gripped:
identifying whether at least one first parameter associated with the first antenna and at least one second parameter associated with the second antenna meet an antenna change condition; and
controlling the RF circuitry to provide a third RF signal corresponding to the first frequency band to the second antenna, based on the at least one first parameter and the at least one second parameter meeting the antenna change condition.

13. The method of claim 12, further comprising controlling the RF circuitry to provide the third RF signal to the first antenna, based on the at least one first parameter and the at least one second parameter not meeting the antenna change condition.

14. The method of claim 9, further comprising controlling, based on identifying that the electronic device is not gripped, the RF circuitry to provide the third RF signal corresponding to the first frequency band to the first antenna.

15. The method of claim 9, wherein based on the folding state being the closed state, a first distance to a third antenna most adjacent from the first antenna is less than a second distance to a fourth antenna most adjacent from the second antenna.

16. The method of claim 9, further comprising controlling the RF circuitry to provide a fourth RF signal corresponding to the first frequency band to the first antenna among the plurality of antennas, based on the folding state being the open state.

17. An electronic device comprising:
at least one communication processor including processing circuitry;
a camera;
an RF circuitry connected to the at least one communication processor; and
a plurality of antennas connected to the RF circuitry, memory storing instructions, wherein the instructions, when executed by the at least one communication processor individually and/or collectively, cause the electronic device to:
based on identifying that the camera is in an off state:
control the RF circuitry to provide a first RF signal corresponding to a first frequency band to a first antenna among the plurality of antennas, based on identifying that the camera is changed from the off state to an on state:
control the RF circuitry to provide a second RF signal corresponding to the first frequency band to a second antenna different from the first antenna among the plurality of antennas.

18. The electronic device of claim 17, wherein a first distance between the first antenna and the camera is less than a second distance between the second antenna and the camera.

19. The electronic device of claim 17, wherein the instructions, when executed by the at least one communication processor individually and/or collectively, cause the electronic device to, as at least part of controlling the RF circuitry:
provide the second RF signal to the second antenna based on identifying that the camera is changed from the off state to the on state, and
control the RF circuitry to provide the second RF signal to the second antenna, based on identifying that a maximum transmission power level (MTPL) corresponding to the second antenna is a threshold or less.

* * * * *